United States Patent
Johnson

(10) Patent No.: US 7,268,538 B2
(45) Date of Patent: Sep. 11, 2007

(54) MAGNETIC ROTATIONAL POSITION SENSOR

(75) Inventor: Gary W. Johnson, Huntington, IN (US)

(73) Assignee: Wabash Technologies, Inc., Huntington, IN (US)

(*) Notice: Subject to any disclaimer, the term of this patent is extended or adjusted under 35 U.S.C. 154(b) by 0 days.

(21) Appl. No.: 11/252,857

(22) Filed: Oct. 18, 2005

(65) Prior Publication Data
US 2006/0038557 A1 Feb. 23, 2006

Related U.S. Application Data

(63) Continuation-in-part of application No. 10/348,234, filed on Jan. 21, 2003, now Pat. No. 6,956,368, which is a continuation-in-part of application No. 09/645,190, filed on Aug. 24, 2000, now Pat. No. 6,509,734, which is a continuation of application No. 09/074,946, filed on May 8, 1998, now Pat. No. 6,137,288.

(51) Int. Cl.
G01B 7/14 (2006.01)
G01B 7/30 (2006.01)
G01R 33/06 (2006.01)

(52) U.S. Cl. .................. 324/207.25; 324/207.21; 324/207.2

(58) Field of Classification Search ........ 324/207.25, 324/207.2, 207.21
See application file for complete search history.

(56) References Cited

U.S. PATENT DOCUMENTS

| | | |
|---|---|---|
| 4,810,965 A | 3/1989 | Fujiwara et al. |
| 5,270,645 A | 12/1993 | Wheeler et al. |
| 5,332,965 A | 7/1994 | Wolf et al. |
| 5,444,369 A | 8/1995 | Luetzow |
| 5,460,035 A | 10/1995 | Pfaffenberger |
| 5,497,081 A | 3/1996 | Wolf et al. |
| 5,504,427 A | 4/1996 | Cooper et al. |
| 5,506,502 A | 4/1996 | Maennle |
| 5,512,820 A | 4/1996 | Alfors |
| 5,521,495 A | 5/1996 | Takahashi et al. |
| 5,544,000 A | 8/1996 | Suzuki et al. |
| 5,572,120 A | 11/1996 | Takaishi et al. |
| 5,578,962 A | 11/1996 | Rastegar |
| 5,600,238 A | 2/1997 | Holloway et al. |
| 5,602,471 A | 2/1997 | Muth et al. |
| 5,611,548 A | 3/1997 | Dahlhaus |
| 5,621,179 A | 4/1997 | Alexander |
| 5,625,239 A | 4/1997 | Persson et al. |
| 5,625,289 A | 4/1997 | Daetz et al. |
| 5,627,465 A | 5/1997 | Alfors et al. |
| 5,698,778 A | 12/1997 | Ban et al. |
| 5,712,561 A | 1/1998 | McCurley et al. |
| 6,137,288 A | 10/2000 | Luetzow |
| 6,404,185 B1 | 6/2002 | Allwine |
| 6,472,865 B1 | 10/2002 | Tola et al. |
| 6,538,426 B1 | 3/2003 | Enrietto et al. |
| 6,586,929 B1 | 7/2003 | Luetzow |

(Continued)

Primary Examiner—Reena Aurora
(74) Attorney, Agent, or Firm—Krieg DeVault LLP

(57) ABSTRACT

A magnetic rotational position sensor including first and second magnets spaced apart to define an air gap and cooperating with one another to generate a magnetic field within the air gap extending along an axis of rotation. At least one magnetic flux sensor is positioned within the magnetic field and is operable to sense varying magnitudes of magnetic flux in response to relative rotational movement between the magnetic field and the magnetic flux sensor about the axis of rotation.

30 Claims, 19 Drawing Sheets

U.S. PATENT DOCUMENTS

| | | |
|---|---|---|
| 6,675,640 B2 | 1/2004 | Ehrlich et al. |
| 6,724,185 B2 | 4/2004 | Ooki et al. |
| 6,940,275 B2 * | 9/2005 | Sogge .................... 324/207.2 |
| 7,030,606 B2 * | 4/2006 | Kato et al. ............. 324/207.25 |
| 2001/0052258 A1 | 12/2001 | Ehrlich et al. |
| 2003/0122641 A1 | 7/2003 | Luetzow |
| 2004/0160220 A1 | 8/2004 | Wendt |

* cited by examiner

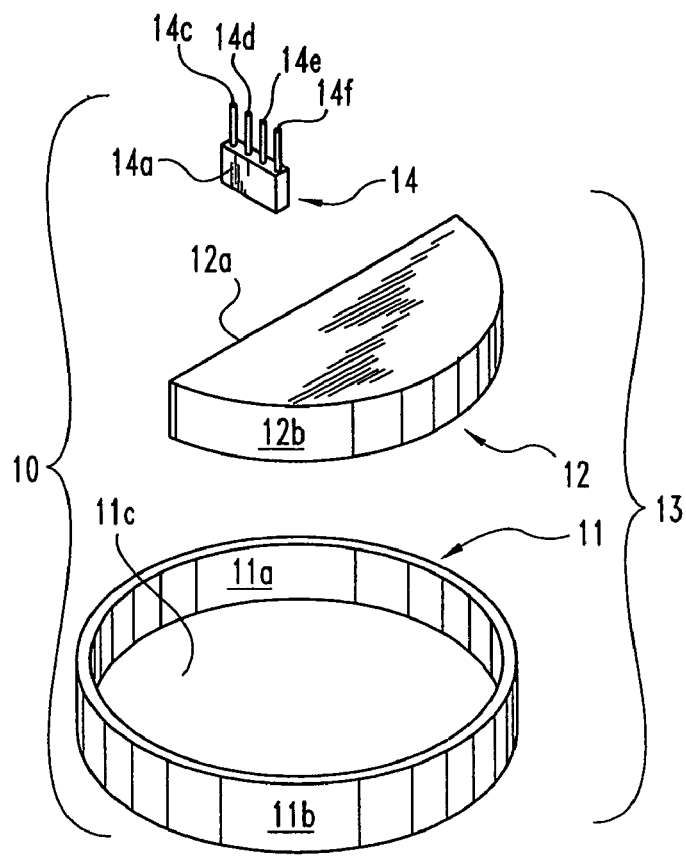
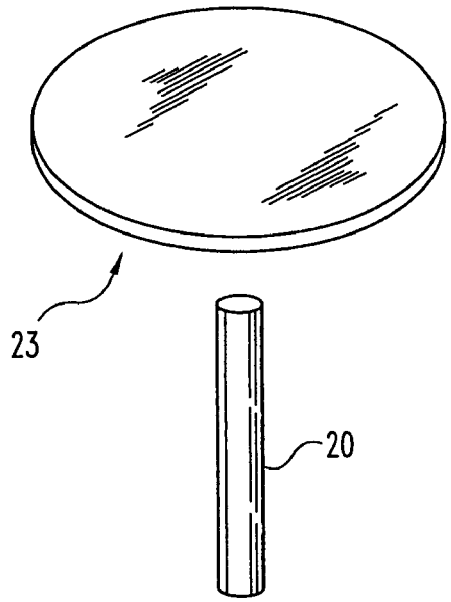
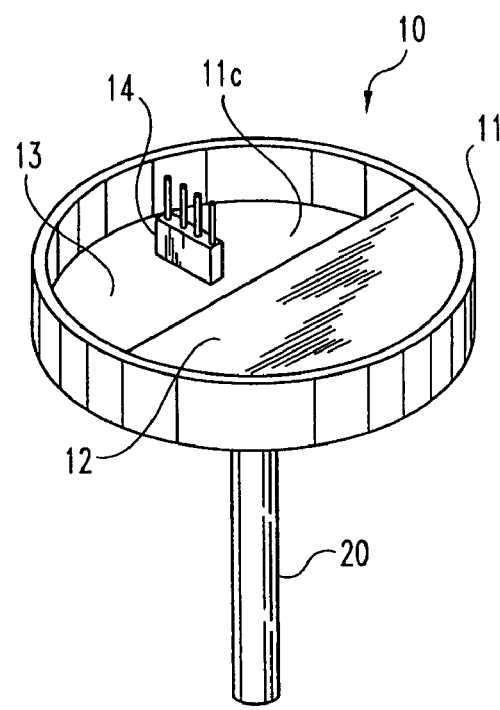
*Fig. 1A*    *Fig. 1B*

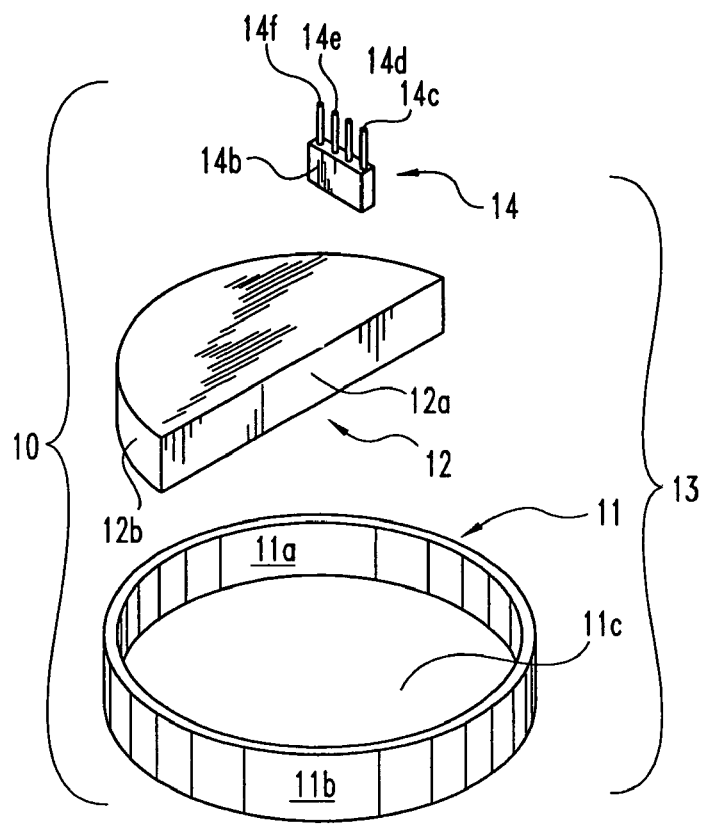
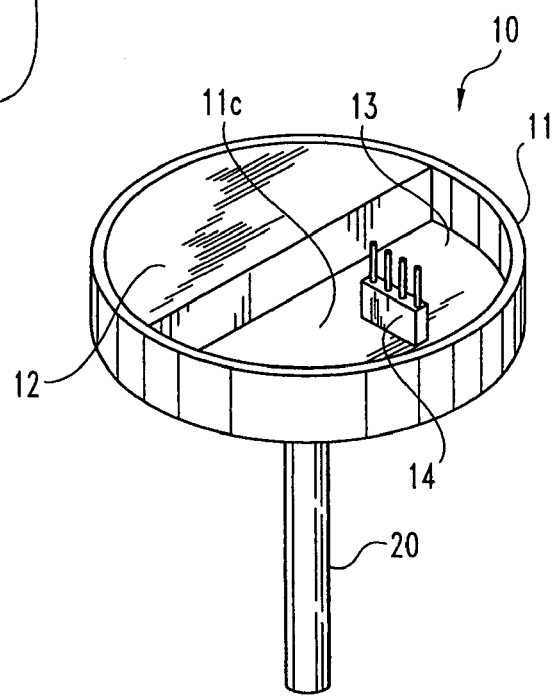
*Fig. 1C*  *Fig. 1D*

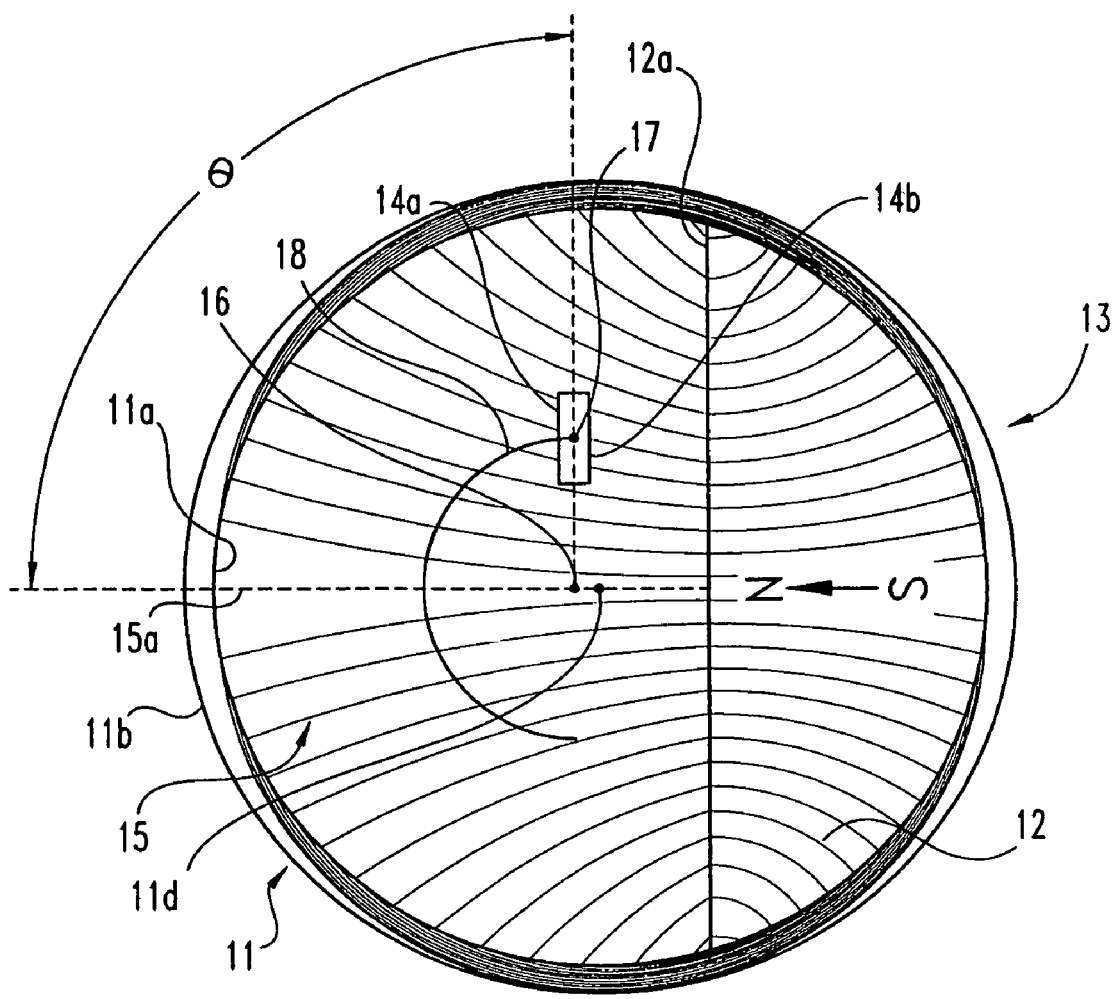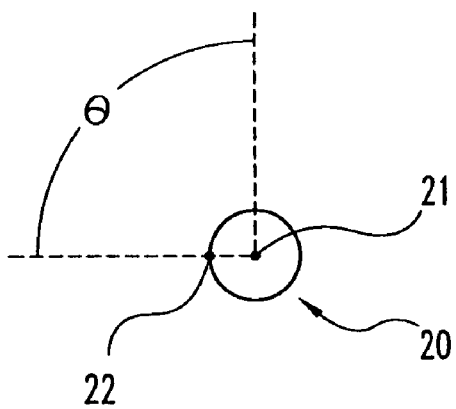
Fig. 2C

MAGNETIC ROTATIONAL POSITION SENSOR

CROSS REFERENCE TO RELATED APPLICATIONS

This application is a continuation-in-part of patent application Ser. No. 10/348,234, filed Jan. 21, 2003 now U.S. Pat. No. 6,956,368, which is a continuation-in-part of patent application Ser. No. 09/645,190, filed Aug. 24, 2000 and issued on Jan. 21, 2003 as U.S. Pat. No. 6,509,734, which is a continuation of patent application Ser. No. 09/074,946, filed May 8, 1998 and issued on Oct. 24, 2002 as U.S. Pat. No. 6,137,288, the contents of each patent application hereby being incorporated by reference.

BACKGROUND

The present invention generally relates to the field of rotational position sensors, and more specifically to a magnetic rotational position sensor for sensing position about an axis of rotation over a definable range of rotation. It is one object of the present invention to provide an improved magnetic rotational position sensor. Further objects, features, advantages, benefits, and further aspects of the present invention will become apparent from the drawings and description contained herein.

SUMMARY

The present invention relates generally to magnetic rotational position sensors. While the actual nature of the invention covered herein can only be determined with reference to the claims appended hereto, certain forms of the invention that are characteristic of the preferred embodiments disclosed herein are described briefly as follows.

In one form of the present invention, a magnetic rotational position sensor is provided, comprising first and second magnets spaced apart to define an air gap and cooperating with one another to generate a magnetic field extending across the air gap and positioned along an axis of rotation. First and second magnetic flux sensors are positioned within the magnetic field and are operable to sense varying magnitudes of magnetic flux in response to relative rotational movement of the magnetic field. The first magnetic flux sensor defines a first sensing plane extending along a first sensor axis, with the first sensor axis arranged substantially parallel to and offset from the axis of rotation. The second magnetic flux sensor defines a second sensing plane extending along a second sensor axis, with the second sensor axis arranged substantially parallel to and offset from the axis of rotation.

In another form of the present invention, a magnetic rotational position sensor is provided, comprising first and second magnets spaced apart to define an air gap, and first and second shaped pole pieces positioned adjacent respective ones of the first and second magnets and facing one another across the air gap. The first and second shaped pole pieces cooperate with the first and second magnets to generate a magnetic field extending across the air gap and positioned along an axis of rotation. At least one magnetic flux sensor is positioned within the magnetic field and is operable to sense varying magnitudes of magnetic flux in response to relative rotational movement between the magnetic field and the magnetic flux sensor.

In still another form of the present invention, a magnetic rotational position sensor is provided, comprising a loop pole piece having a peripheral outer wall defining an inner region. The loop pole piece has a first overall dimension along a first axis and a second overall dimension along a second axis, with the first overall dimension being greater than the second overall dimension to provide the loop pole piece with an oblong configuration. First and second magnets are positioned within the inner region of the loop pole piece adjacent the peripheral outer wall and are spaced apart to define an air gap. The first and second magnets cooperate with said loop pole piece to generate a magnetic field extending across the air gap and positioned along an axis of rotation. At least one magnetic flux sensor is positioned within the magnetic field and is operable to sense varying magnitudes of magnetic flux in response to relative rotational movement between the magnetic field and the at least one magnetic flux sensor.

In a further form of the present invention, a magnetic rotational position sensor is provided, comprising a loop pole piece including first and second wall portions each having a substantially linear configuration, with the first and second wall portions arranged generally parallel to one another and spaced apart to define an inner region of the loop pole piece. First and second magnets are positioned within the inner region of the loop pole piece adjacent respective ones of the first and second wall portions, with the first and second magnets spaced apart to define an air gap. The first and second magnets cooperate with the loop pole piece to generate a magnetic field extending across the air gap and positioned along an axis of rotation. At least one magnetic flux sensor is positioned within the magnetic field and is operable to sense varying magnitudes of magnetic flux in response to relative rotational movement between the magnetic field and the at least one magnetic flux sensor.

BRIEF DESCRIPTION OF THE DRAWINGS

FIG. 1A is a first exploded view of a first embodiment of a magnetic rotational position sensor according to one form of the present invention.

FIG. 1B is a first perspective view of the magnetic rotational position sensor of FIG. 1A, as assembled and adjoined to a control shaft.

FIG. 1C is a second exploded view of the magnetic rotational position sensor of FIG. 1A.

FIG. 1D is a second perspective view of the magnetic rotational position sensor of FIG. 1A, as assembled and adjoined to a control shaft.

FIG. 2C is a third diagrammatic illustration of the magnetic circuit of FIGS. 1A-1D.

DESCRIPTION

Figure 2A:
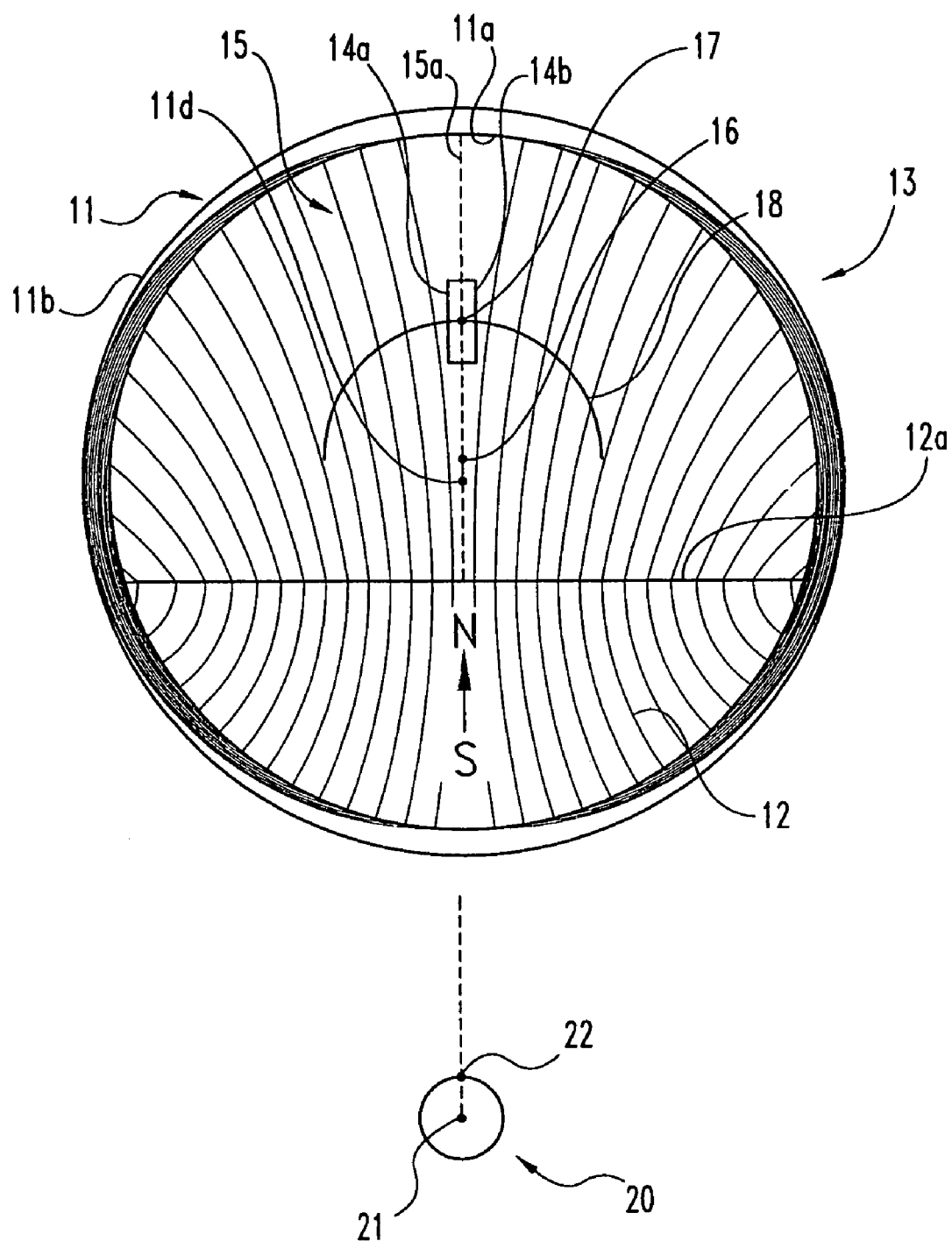
FIG. 2A is a first diagrammatic illustration of a magnetic circuit of FIGS. 1A-1D.

For the purposes of promoting an understanding of the principles of the invention, reference will now be made to the embodiments illustrated in the drawings and specific language will be used to describe the same. It will nevertheless be understood that no limitation of the scope of the invention is hereby intended, such alterations and further modifications in the illustrated devices, and such further applications of the principles of the invention as illustrated herein being contemplated as would normally occur to one skilled in the art to which the invention relates.

The present invention is a novel and unique magnetic rotational position sensor that senses each degree of rotation of a control shaft about an axis of rotation over a definable range of rotation without experiencing magnetic hysteresis. For purposes of the present invention, a control shaft is broadly defined as any article of manufacture or any combination of manufactured articles that is adjoined to an object, e.g. a throttle diaphragm, a foot pedal, a piston, etc., to control the linear, angular and/or rotational movement of the object as the control shaft is rotated about an axis of rotation, e.g. a longitudinal axis of the control shaft. Referring to FIGS. 1A-1D, a first embodiment of a magnetic rotational position sensor 10 in accordance with the present invention is shown. Magnetic rotational position sensor 10 senses each degree of rotation of a control shaft 20 about an axis of rotation over a 180 degree range of rotation without experiencing magnetic hysteresis as further described in FIGS. 2A-2C and accompanying text.

Magnetic rotational position sensor 10 comprises a loop pole piece. For purposes of the present invention, a loop pole piece is broadly defined as any magnetizable article of manufacture or any combination of manufactured magnetizable articles that has a closed configuration defining an air gap area. The present invention contemplates that the loop pole piece can vary in geometric size and shape, and can be made from any magnetizable material. Preferably, the loop pole piece is a soft magnetic steel loop pole piece 11 having an annular inner diameter surface 11a defining an air gap area 11c and an annular outer diameter surface 11b as shown in FIGS. 1A-1D. It is also preferred that loop pole piece 11 has a thickness of 0.1 inches, inner diameter surface 11a has a radius of 0.7 inches, and outer diameter surface 11b has a radius of 0.75 inches.

Magnetic rotational position sensor 10 further comprises a magnet disposed within air gap area 11c to constitute a magnetic circuit that generates a magnetic field within air gap area 11c and encloses the magnetic field within loop pole piece 11 to prevent magnetic hysteresis. Accordingly, the present invention contemplates that either a north pole surface of the magnet is facing and spaced from inner diameter surface 11a and a south pole surface of the magnet is facing and adjacent inner diameter surface 11a, or a north pole surface of the magnet is facing and adjacent inner diameter surface 11a and a south pole surface of the magnet is facing and spaced from inner diameter surface 11a, or a north pole surface and a south pole surface of the magnet are both facing and spaced from inner diameter surface 11a. The present invention further contemplates that the magnet can vary in geometric size and shape, and can be any type of magnet. Preferably, the magnet is an injection molded rare earth magnet 12 having a substantially semi-circular configuration that is void of any magnetic flux density "hot spots" along both pole surfaces. Magnet 12 is disposed within air gap area 11c to constitute a magnetic circuit 13 as shown in FIGS. 1B and 1D. Magnet 12 has a north pole surface 12a facing and spaced from inner diameter surface 11a and a south pole surface 12b facing and adjoined to inner diameter surface 11a to generate an equally balanced magnetic field 15 throughout air gap area 11c and to enclose magnetic field 15 within loop pole piece 11 as further described in FIGS. 2A-2C and accompanying text. It is also preferred that magnet 12 has a thickness of 0.1 inches, and a maximum radial length of south pole surface 12b is 0.25 inches. Loop pole piece 11 is adjoined to control shaft 20 to synchronously rotate magnetic field 15 about a second rotational axis for each degree of rotation of control shaft 20 about a first rotational axis, e.g. longitudinal axis 21 of control shaft 20, as further described in FIGS. 2A-2C and accompanying text. For purposes of the present invention, the term adjoined is broadly defined as an unitary fabrication, a permanent affixation, a detachable coupling, a continuous engagement or a contiguous disposal by any means of a first article and a second article, e.g. south pole surface 12b and inner diameter surface 11a, and loop pole piece 11 and control shaft 20. Preferably, loop pole piece 11, magnet 12 and control shaft 20 are encapsulated in plastic to permanently affix south pole surface 12a and inner diameter surface 11a via a plastic bonding, and to permanently affix loop pole piece 11 and control shaft 20 via a plastic base 23 as shown in FIGS. 1A-1D.

Figure 4A:
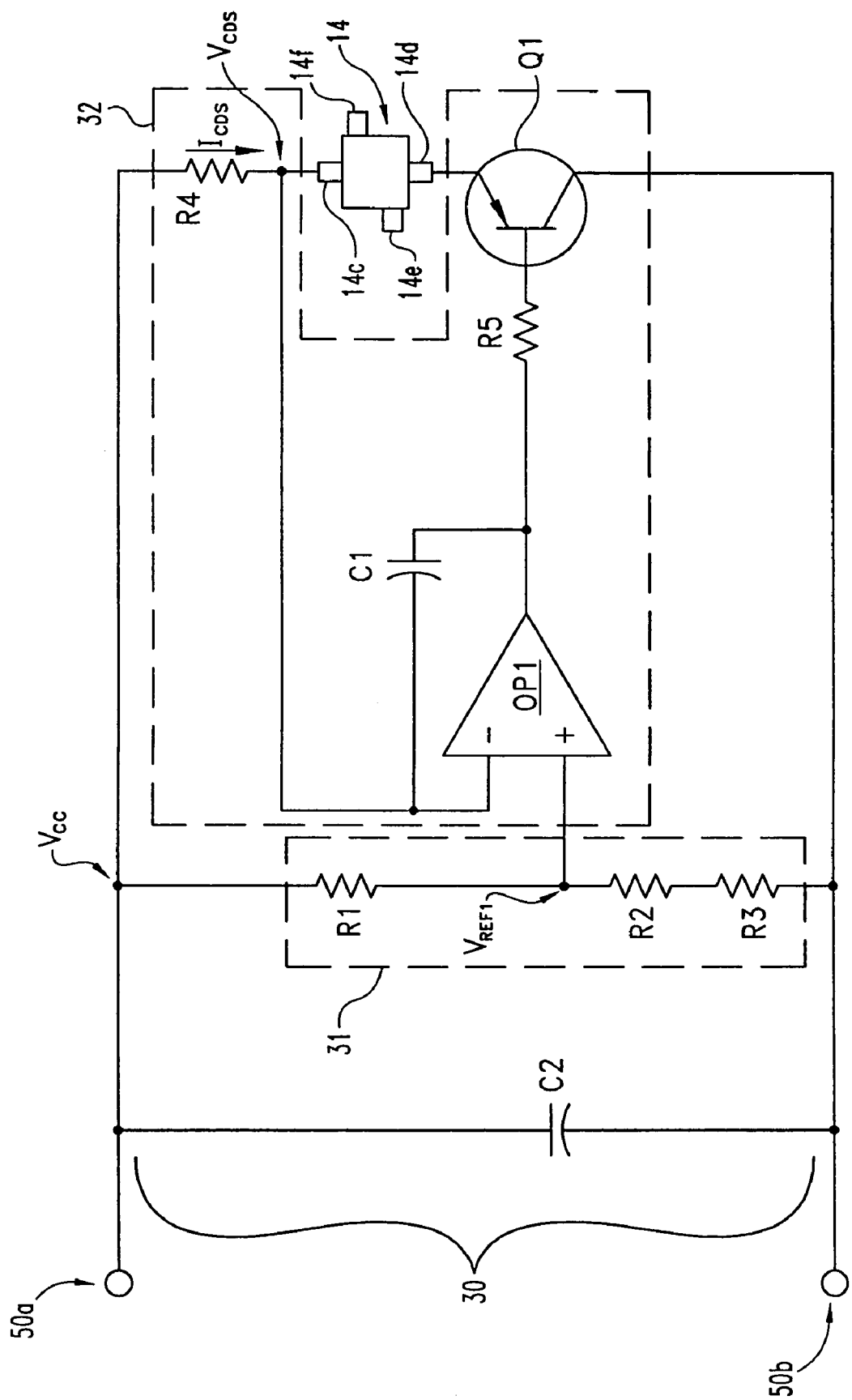
FIG. 4A is a schematic of a preferred embodiment of a drive circuit in accordance with the present invention.

Magnetic rotational position sensor 10 further comprises a magnetic flux sensor. For purposes of the present invention, a magnetic flux sensor is broadly defined as any device operable to sense a magnitude of a magnetic flux density passing through the device and operable to generate at least one voltage sensing signal representative of a magnitude of magnetic flux density passing through the device. Preferably, the magnetic flux sensor is a Hall effect device 14, e.g. a HZ-302C (SIP type) Hall effect device manufactured by Ashai Kasei Electronics Co., Ltd., as shown in FIGS. 1A-1D. Hall effect device 14 has a first plane 14a and a second plane 14b, and is operable to sense a magnitude of magnetic flux density passing through planes 14a and 14b. Hall effect device includes an input lead 14c, a reference lead 14d, a first output lead 14e and a second output lead 14f. In response to a current drive signal $I_{DS}$ and a voltage drive signal $V_{DS}$, Hall effect device 14 is also operable to generate a first voltage sensing signal $V_{SS1}$ and a second voltage sensing signal $V_{SS2}$. Both voltage sensing signals $V_{SS1}$ and $V_{SS2}$ are representative of a magnitude of magnetic flux density passing through planes 14a and 14b, respectively, as further described in FIGS. 4A and 4B, and accompanying text.

Figure 2B:
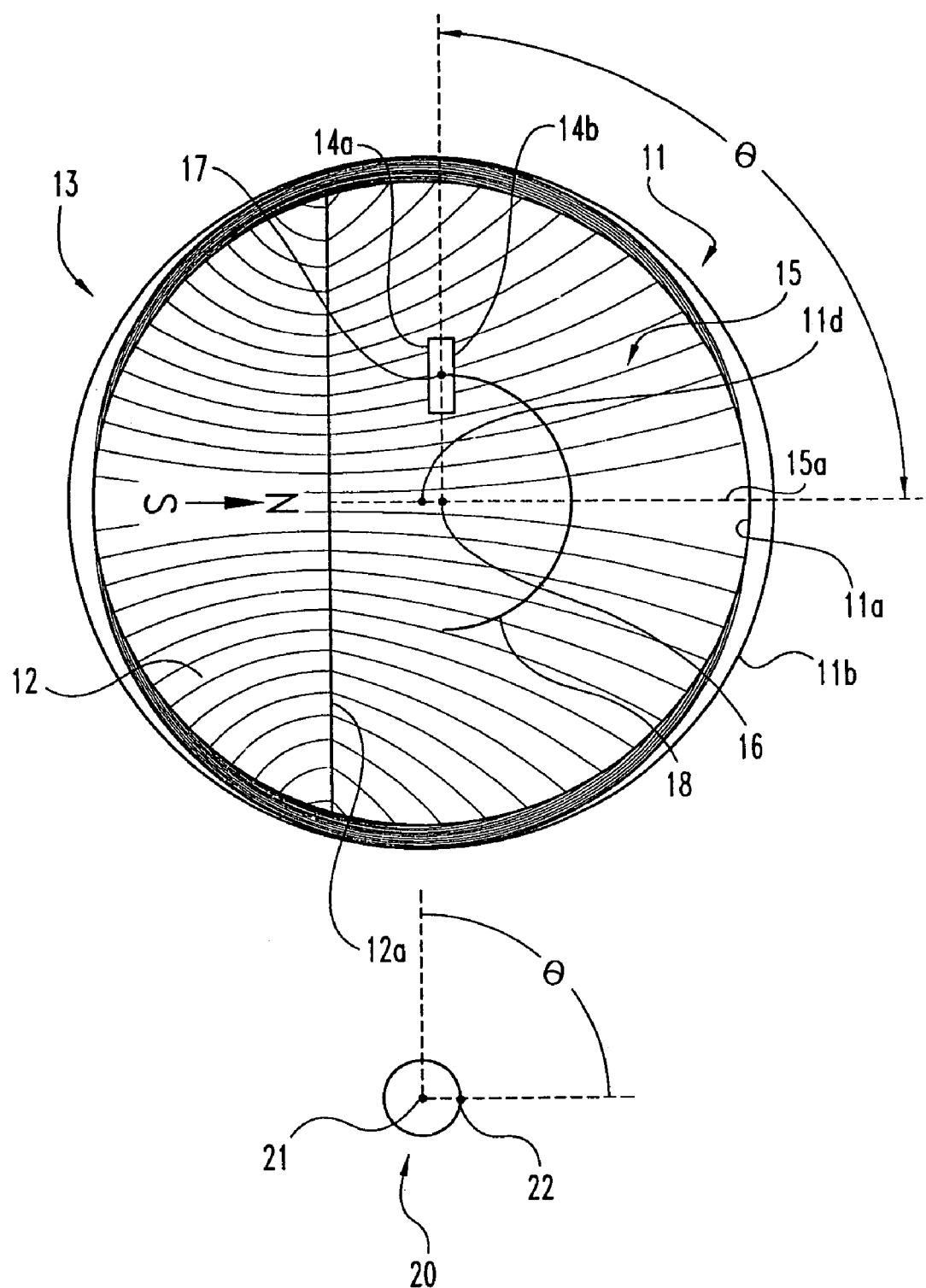
FIG. 2B is a second diagrammatic illustration of the magnetic circuit of FIGS. 1A-1D.

Referring to FIGS. 2A-2C, to sense each degree of rotation of control shaft 20 about an axis of rotation, e.g. a longitudinal axis 21 of control shaft 20, over a definable range of rotation, a different magnitude of magnetic flux density must pass through planes 14a and 14b of magnetic flux sensor 14 for each degree of synchronized rotation of magnetic field 15 about a second rotational axis, e.g. an axis of rotation 16, over the definable range of rotation. Consequently, an angular orientation angle θ of planes 14a and 14b relative to magnetic field 15 must change for each degree of synchronized rotation of magnetic field 15 about rotational axis 16 over the definable range of rotation. Preferably, when magnetic flux sensor 14 is disposed along a center line 15a of magnetic field 15, planes 14a and 14b are parallel to magnetic field 15, i.e. an angular orientation angle θ of zero degrees, as shown in FIG. 2A. It is to be appreciated and understood that angular orientation angle θ relative to magnetic field 15 will change with each degree of synchronized rotation of magnetic field 15 about rotational axis 16 over a ±ninety (90) degree range of synchronized rotation of magnetic field 15 relative to magnetic flux sensor 14 as evidenced by the synchronized rotational movement of a center point 17 of magnetic flux sensor 14 and a reference point 22 of control shaft 20 as shown in FIGS. 2B and 2C. Thus, it is to be appreciated and understood that each degree of rotation of control shaft 20 about longitudinal axis 21 over a 180 degree range of rotation can be sensed because each degree of rotation of control shaft 20 about longitudinal axis 21 exclusively corresponds to a distinct degree of synchronized rotation of magnetic field 15 about rotational axis 16 and a different magnitude of magnetic flux density will pass through magnetic flux sensor 14 for each degree of synchronized rotation of magnetic field 15 about rotational axis 16 over the 180 degree range of rotation.

To linearly sense each degree of rotation of control shaft 20 about longitudinal axis 21 over the 180 degree range of rotation, angular orientation angle θ must uniformly change for each degree of synchronized rotation of magnetic field 15 about rotational axis 16. One aspect of the present invention is that for a selected rotational axis of magnetic field 15 that intersects center line 15a, angular orientation angle θ uniformly changes along one radial arc originating from the selected rotational axis for each degree of synchronized rotation of magnetic field 15 about the selected rotational axis over approximately an ±eighty (80) degree range of synchronized rotation of magnetic field 15. For example, angular orientation angle θ uniformly changes along a radial arc 18 originating from rotational axis 16 for each degree of synchronized rotation of magnetic field 15 about rotational axis 16 over approximately an ±eighty (80) degree range of synchronized rotation of magnetic field 15 relative to magnetic flux sensor 14. Thus, it is preferred that magnetic flux sensor is initially disposed within magnetic field 15 along center line 15a of magnetic field 15 with planes 14a and 14b parallel to magnetic field 15 and center point 17 of magnetic flux sensor 14 being an intersection point of center line 15a of magnetic field 15 and radial arc 18.

Referring still to FIGS. 2A-2C, several important points must be appreciated and understood. First, the present invention contemplates that the axis of rotation of control shaft 20 may or may not coincide with a selected rotational axis of a generated and enclosed magnetic field. Preferably, the axis of rotation of control shaft 20 does coincide with the selected rotational axis of the magnetic field, e.g. longitudinal axis 21 of shaft 20 coinciding with rotational axis 16 of magnetic field 15. Second, the relative dimensions of an inner diameter surface of a loop pole piece in accordance with the present invention and a north pole surface and a south pole surface of a magnet in accordance with the present invention defines the maximum synchronous range of rotation of a generated and enclosed magnetic field relative to a magnetic flux sensor. For example, inner diameter surface 11a of loop pole piece 11, and poles surfaces 12a and 12b enable magnetic field 15 to be rotated at least 180 degrees relative to magnetic flux sensor 14. Finally, the symmetrical configurations of a loop pole piece and a magnet void of magnetic flux density "hot spots" along both pole surfaces relative to a center line of a generated and enclosed magnetic field equally balances the magnetic field throughout the air gap area. For example, the symmetrical configurations of loop pole piece 11 and magnet 12 relative to center line 15a of magnetic field 15 equally balances magnetic field 15 throughout air gap area 11c.

Figure 3A:
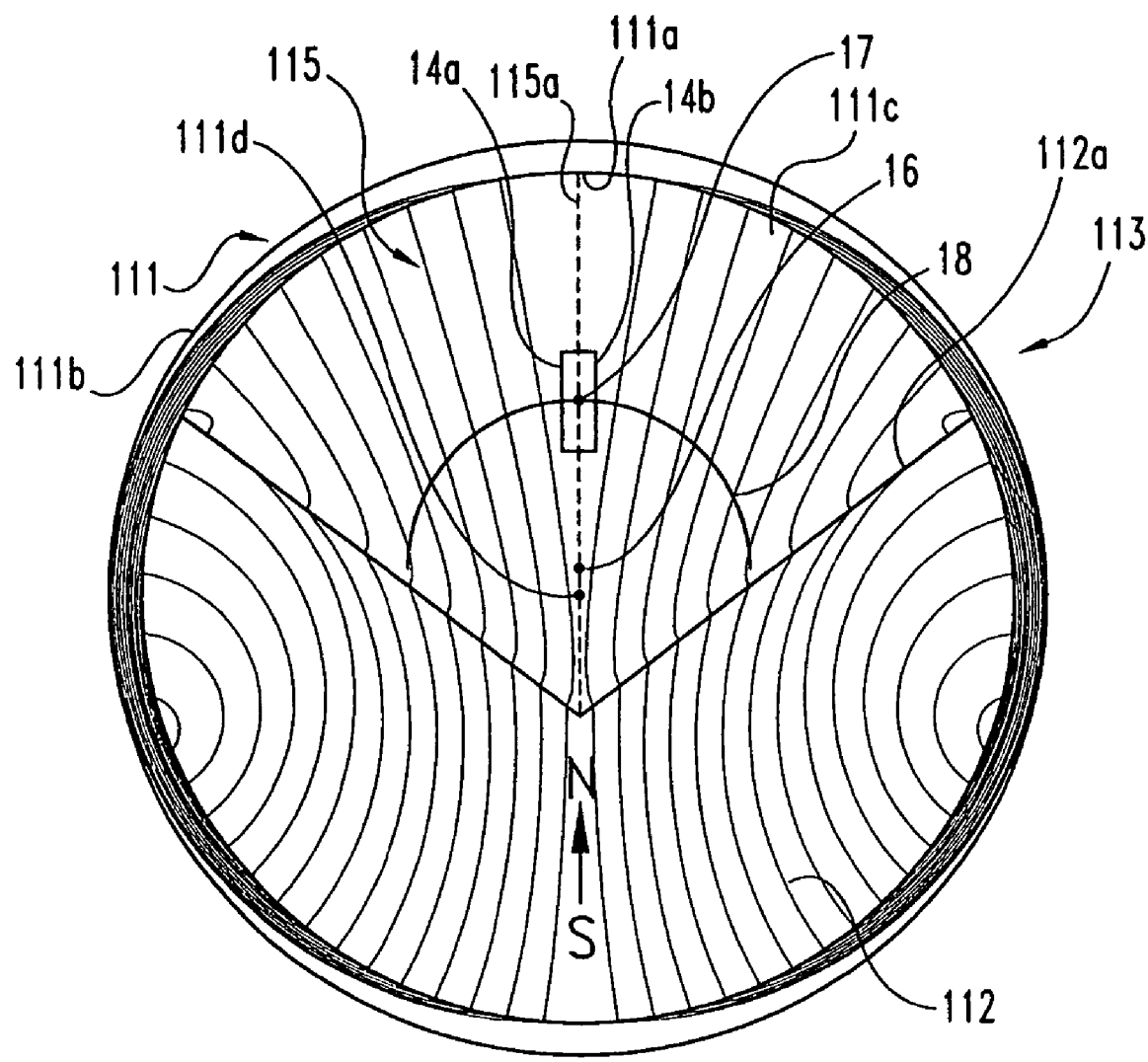
FIG. 3A is a diagrammatic illustration of a second embodiment of a magnetic circuit in accordance with the present invention.
Figure 3B:
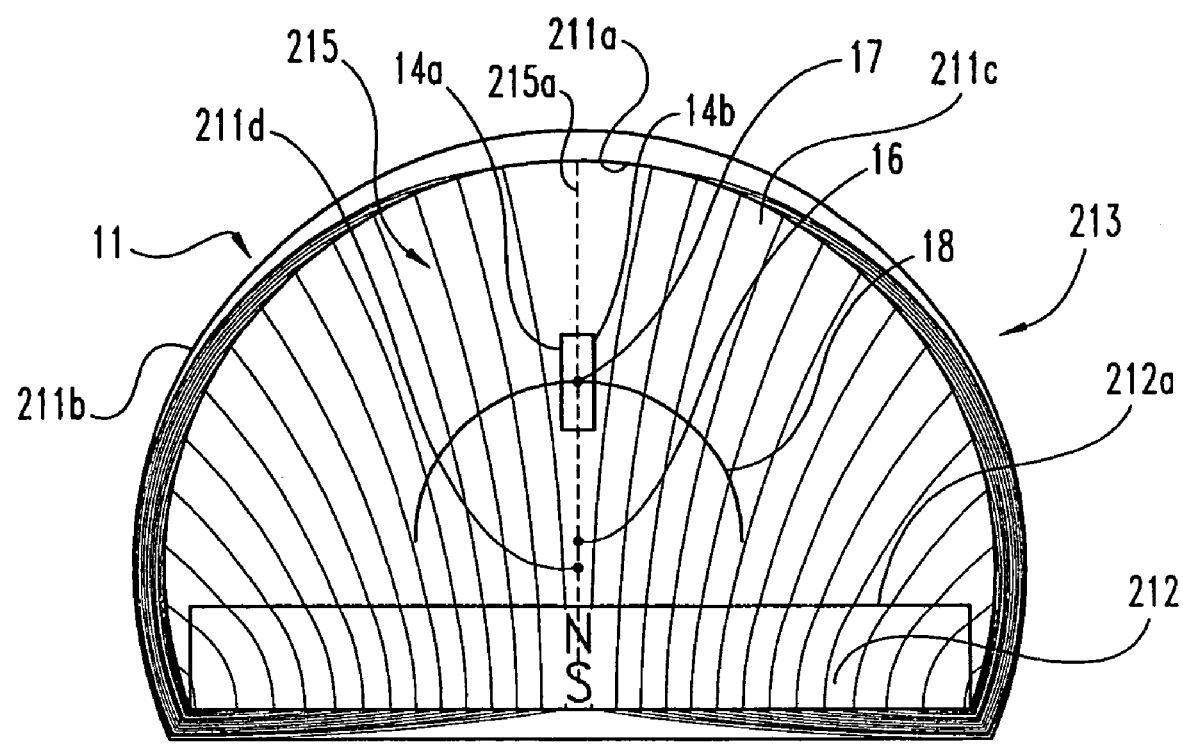
FIG. 3B is a diagrammatic illustration of a third embodiment of a magnetic circuit in accordance with the present invention.
Figure 3C:
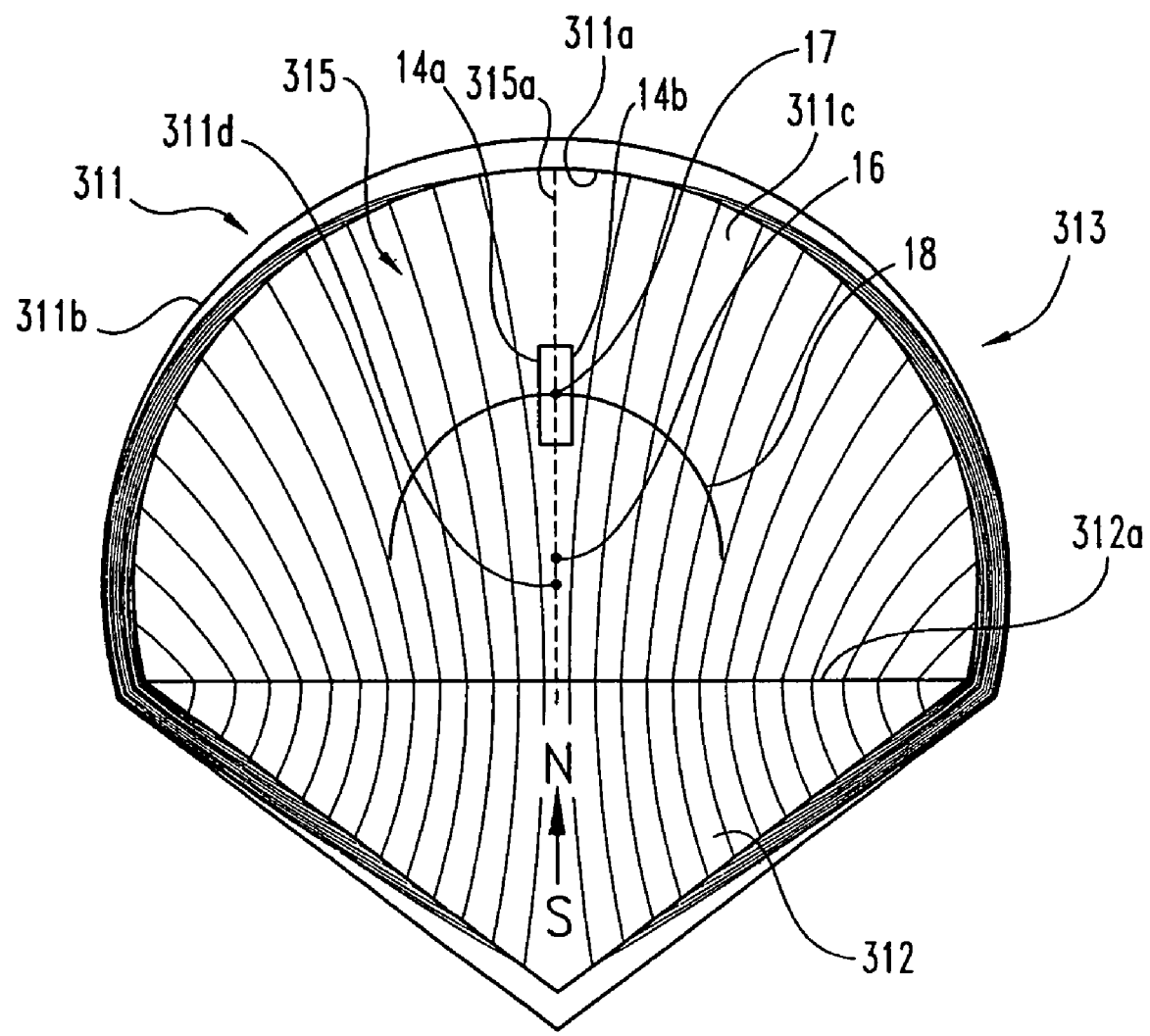
FIG. 3C is a diagrammatic illustration of a fourth embodiment of a magnetic circuit in accordance with the present invention.

Referring to FIGS. 3A-3C, some examples of other magnetic circuits in accordance with the present invention having symmetrical configurations of a loop pole piece and of a magnet void of magnetic flux density "hot spots" along both pole surfaces relative to a centerline of a magnetic field are shown. Referring to FIG. 3A, a second embodiment of a magnetic circuit 113 includes a loop pole piece 111 having an annular configuration and a magnet 112 having a three quarter configuration. Loop pole piece 111 has an annular inner diameter surface 111a defining an air gap area 111c. Magnet 112 is disposed within air gap area 111c and has a north pole surface 112a facing and spaced from inner diameter surface 111a and a south pole surface 112b adjoined to inner diameter surface 111a to generate and enclose an equally balanced magnetic field 115 throughout air gap area 111c. Magnetic circuit 113 is advantageous to provide a more concentrated magnetic field 115 in situations where the definable range of rotation of control shaft 20 is to be thirty (30) degrees. Referring to FIG. 3B, a third embodiment of a magnetic circuit 213 includes a loop pole piece 211 having a dome configuration and a magnet 212 having a rectangular prism configuration. Loop pole piece 211 has an inner diameter surface 211a defining an air gap area 211c. Magnet 212 is disposed within air gap area 211c and has a north pole surface 212a facing and spaced from inner diameter surface 211a and a south pole surface 212b adjoined to inner diameter surface 211a to generate and enclose an equally balanced magnet field 215 throughout air gap area 211c. Magnetic circuit 213 is advantageous in situations where the simplicity of manufacturing a magnet or the expense in purchasing a magnet is of primary importance. Referring to FIG. 3C, a fourth embodiment of a magnetic circuit 313 includes a loop pole piece 311 having a diamond configuration and a magnet 312 having a triangular prism configuration. Loop pole piece 311 has an inner diameter surface 311a defining an air gap area 311c. Magnet 312 is disposed within air gap area 311c and has a north pole surface 312a facing and spaced from inner diameter surface 311a and a south pole surface 312b adjoined to inner diameter surface 311a to generate and enclose an equally balanced magnet field 315 throughout air gap area 311c.

As previously described in FIGS. 1A-1D and accompanying text, a current drive signal $I_{DS}$ and a voltage drive signal $V_{DS}$ need to be supplied to Hall effect device 14 to generate voltage sensing signals $V_{SS1}$ and $V_{SS2}$. The present invention contemplates that any power source supplying current drive signal $I_{DS}$ and voltage drive signal $V_{DS}$ to Hall effect device 14 via input lead 14a may be exposed to adverse temperatures as low as −40° Celsius to as high as 150° Celsius when Hall effect device 14 is located in a engine compartment of a motor vehicle, and consequently, it is to be appreciated and understood that current drive signal $I_{DS}$ and voltage drive signal $V_{DS}$ can significantly fluctuate under such adverse temperature conditions. Accordingly, a preferred embodiment of a drive circuit 30 to invariably generate a constant current drive signal $I_{CDS}$ and a constant voltage drive signal $V_{CDS}$ over such adverse temperatures i Referring to FIG. 4A, drive circuit 30 comprises a voltage divider 31 operable to generate a first reference voltage signal $V_{REF1}$ in response to a power signal $V_{CC}$. Voltage divider 31 including a first resistor R1, a second resistor R2 and a third resistor R3 electrically coupled in series to a power supply terminal 50a and a ground reference terminal 50b of a power source (not shown). Preferably, the power source transmits a power signal $V_{CC}$ of 5.0 volts and first reference voltage signal $V_{REF1}$ is approximately 2.5 volts. The present invention contemplates that resistors R1 and R2 are of equal value and that resistor R3 is of a significantly less value. Preferably, resistors R1 and R2 are 10 k ohm resistors, and resistor R3 is a trimable 1 k ohm resistor.

Drive circuit 30 further comprises a current amplifier 32 operable to generate and control constant current drive signal $I_{CDS}$ and constant voltage drive signal $V_{CDS}$ in response to power signal $V_{CC}$ and a generated first reference voltage signal $V_{REF1}$. Current amplifier 32 includes a first operational amplifier OP1, a first bipolar pnp transistor Q1, a fourth resistor R4, a fifth resistor R5, and a first capacitor C1. Operational amplifier OP1 has a non-inverting input electrically coupled to voltage divider 31 to receive a generated reference voltage signal $V_{REF1}$, and an inverting input electrically coupled to input lead 14c of Hall effect device 14. Transistor Q1 has an emitter lead electrically coupled to reference lead 14d of Hall effect device 14 and a collector lead electrically coupled to ground reference terminal 50b. Resistor R4 electrically couples power supply terminal 50a to input lead 14c of Hall effect device 14, resistor R5 electrically couples a power output of operational amplifier OP1 to a base lead of transistor Q1, and capacitor C1 electrically couples the power output of operational amplifier OP1 to the inverting input of operational amplifier OP1. Preferably, constant current drive signal $I_{CDS}$ is 7.0 milliamperes ±10 microamperes and constant voltage drive signal $V_{CDS}$ is approximately 4.2 volts. Accordingly, it is preferred that resistor R4 is a 150 ohm resistor, resistor R5 is a 470 ohm resistor, and capacitor C1 is a 0.01 microfarads capacitor. The present invention further contemplates that drive circuit 30 can further comprise a second capacitor C2 electrically coupling power supply terminal 50a and ground reference terminal 50b to eliminate any noise from power signal $V_{CC}$. Preferably, capacitor C2 is a 0.1 microfarads capacitor.

Figure 4B:
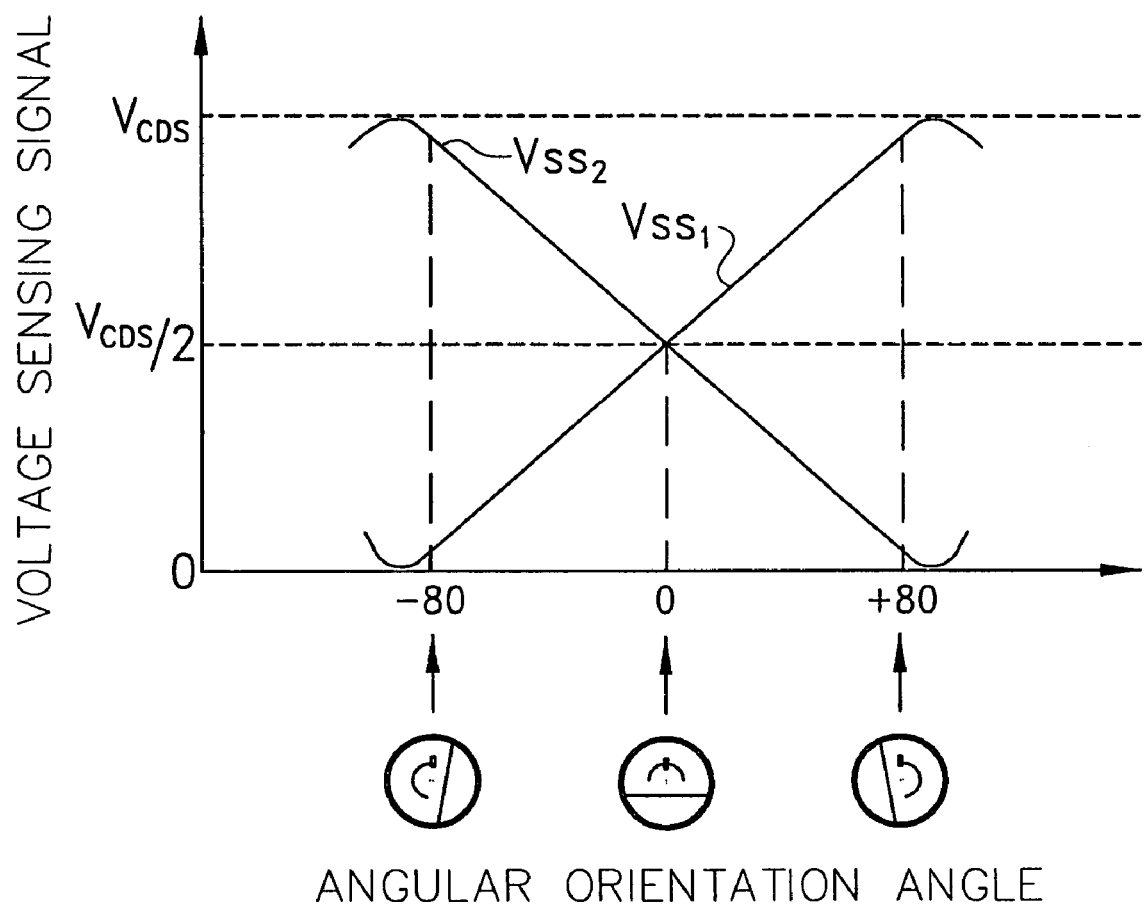
FIG. 4B is a graph depicting a waveform of a first generated voltage sensing signal and a waveform of a second generated voltage sensing signal of a preferred embodiment of the magnetic flux sensor of FIGS. 1A-1D.

Upon receipt of a generated constant current drive signal $I_{CDS}$ and a generated constant voltage drive signal $V_{CDS}$, via input lead 14c, Hall effect device 14 generates voltage sensing signals $V_{SS1}$ and $V_{SS2}$. Waveforms of generated voltage sensing signals $V_{SS1}$ and $V_{SS2}$ as related to angular orientation angle θ of Hall effect device 14 relative to magnetic field 15 are shown in FIG. 4B. Referring to FIGS. 2A-2C and 4B, it is to be appreciated and understood that each value of voltage sensing signals $V_{SS1}$ and $V_{SS2}$ along the waveforms exclusively corresponds to a distinct degree of rotation of control shaft 20 about an axis of rotation, e.g. longitudinal axis 21 of control shaft 20, over a 180 degree range of rotation. It is to be further appreciated and understood that voltage sensing signals $V_{SS1}$ and $V_{SS2}$ are linearly generated over a middle 160 degrees of the 180 degree range of rotation. Unfortunately, voltage sensing signals $V_{SS1}$ and $V_{SS2}$ are high impedance loads that are not feasible as voltage output signals. Accordingly, a preferred embodiment of an output signal amplifier 40 is shown in FIG. 5.

Figure 5:
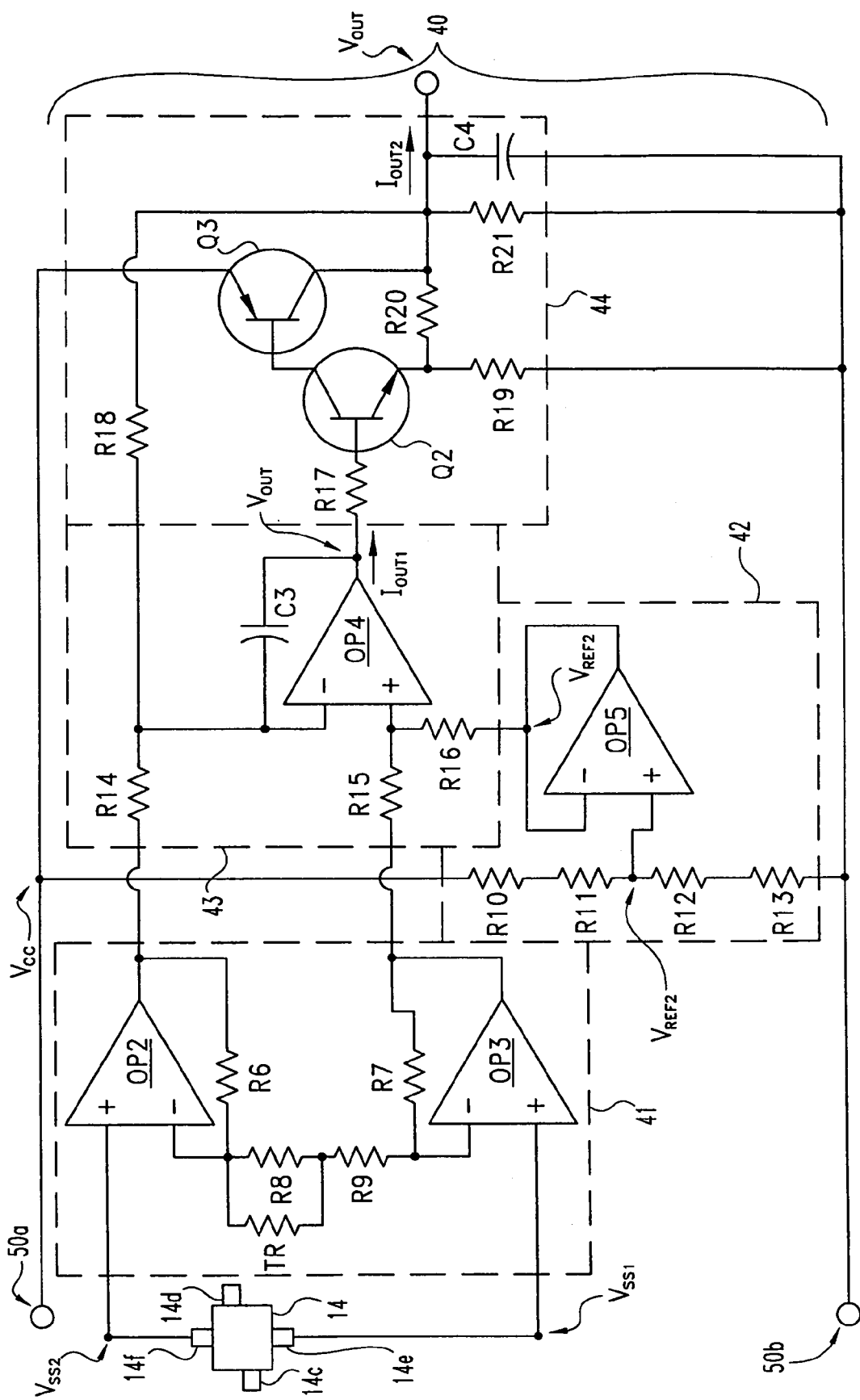
FIG. 5 is a schematic of a preferred embodiment of an output signal amplifier in accordance with the present invention.

Referring to FIG. 5, output signal amplifier 40 comprises a buffer amplifier 41 operable to buffer voltage sensing signals $V_{SS1}$ and $V_{SS2}$ and to counteract any temperature drift of voltage sensing signals $V_{SS1}$ and/or $V_{SS2}$ due to the ambient temperature of Hall effect device 14. Buffer amplifier 41 includes a second operational amplifier OP2, a third operational amplifier OP3, a sixth resistor R6, a seventh resistor R7, an eighth resistor R8, a ninth resistor R9 and a thermistor TR. Operational amplifier OP2 has a non-inverting input electrically coupled to output lead 14f of Hall effect device 14 to receive a generated voltage sensing signal $V_{SS1}$, and operational amplifier OP3 has a non-inverting input electrically coupled to output lead 14e of Hall effect device 14 to receive a generated voltage sensing signal $V_{SS2}$. Resistor R6 electrically couples a power output of operational amplifier OP2 to an inverting input of operational amplifier OP2, resistor R7 electrically couples a power output of operational amplifier OP3 to an inverting input of operational amplifier OP3, resistors R8 and R9 in series electrically couple the inverting input of operational amplifier OP2 and the inverting input of operational amplifier OP3, and thermistor TR is electrically coupled in parallel to resistor R8. Preferably, resistors R6 and R7 are 10 k ohm resistors, and resistors R8 and R9 are 1 k ohm resistors.

Output signal amplifier 40 further comprises a voltage divider 42 operable to generate a second reference voltage signal $V_{REF2}$ in response to a power signal $V_{CC}$. Second reference voltage signal $V_{REF2}$ is generated to correct for any manufacturing anomalies of Hall effect device 14 as further described in FIG. 6A and accompanying text. Voltage divider 42 includes a tenth resistor R10, an eleventh resistor R11, a twelfth resistor R12, and a thirteenth resistor R13 electrically coupled in series to power supply terminal 50a and ground reference terminal 50b. Preferably, power signal $V_{CC}$ is 5.0 volts and second reference voltage signal $V_{REF2}$ is approximately 2.5 volts. The present invention contemplates that resistors R10 and R13 are of equal value and that resistors R11 and R12 are of a significantly less value. Preferably, resistors R10 and R13 are 10 k ohm resistors, and resistors R11 and R12 are trimable 1 k ohm resistors. Voltage divider 42 further includes an operational amplifier OP5 having an non-inverting input electrically coupled to resistors R11 and R12 to receive a generated second reference voltage signal $V_{REF2}$, and an inverting input electrically coupled to a power output.

Output signal amplifier 40 further comprises a differential amplifier 43 operable to generate a voltage output signal $V_{out}$ and a first current output signal $I_{OUT1}$ in response to buffered voltage sensing signals $V_{SS1}$ and $V_{SS2}$, and a generated second reference voltage signal $V_{REF2}$. Differential amplifier 43 includes an operational amplifier OP4, a fourteenth resistor R14, a fifteenth resistor R15, a sixteenth resistor R16 and a third capacitor C3. Resistor R14 electrically couples the power output of operational amplifier OP2 to an inverting input of operational amplifier OP4, resistor R15 electrically couples the power output of operational amplifier OP3 to a non-inverting input of operational amplifier OP4, resistor R16 electrically couples the power output of operational amplifier OP5 to the non-inverting input of operational amplifier OP4, and capacitor C3 electrically couples a power output of operational amplifier OP4 to the inverting input of operational amplifier OP4. It is to be appreciated that voltage output signal $V_{OUT}$ is representative of each degree of rotation of a control shaft 20 about the first rotational axis. Preferably, voltage output signal $V_{OUT}$ ranges between 0 volts and 5.0 volts over the 180 degree range of rotation of control shaft 20, and linearly ranges between 0.5 volts and 4.5 volts over a middle 160 degrees of the 180 degree range of rotation. Accordingly, it is preferred that resistors R14, R15 and R16 are 10 k ohm resistors, and capacitor C3 is a 0.01 microfarads capacitor.

The present invention contemplates that output signal amplifier 40 can further comprises a boost circuit 44 to transmit voltage output signal $V_{OUT}$ and to boost output current signal $I_{OUT1}$. Boost circuit 44 includes a first bipolar npn transistor Q2, a second bipolar pnp transistor Q3, a seventeenth resistor R17, an eighteenth resistor R18, a nineteenth resistor R19, a twentieth resistor R20, a twenty-first resistor R21, and a fourth capacitor C4. An emitter lead of transistor Q3 is electrically coupled to power supply terminal 50a, and a base lead of transistor Q3 is electrically coupled to a collector lead of transistor Q2. Resistor R17 electrically couples the power output of operational amplifier OP4 to a base lead of transistor Q2, resistor R18 electrically couples the inverting input of operational amplifier OP4 to a collector lead of transistor Q3, resistor R19 electrically couples an emitter lead of transistor Q2 to ground reference terminal 50b, resistor R20 electrically couples the emitter lead of transistor Q2 to the collector lead of transistor Q3, and resistor 21 and capacitor C4 electrically couple the collector lead of transistor Q3 to ground reference terminal 50b. Preferably, a boosted output current signal $I_{out2}$ is approximately 5 milliamperes. Accordingly, it is preferred that resistor R17 and R19 are 5.6K ohm resistors, resistor R18 is a 10 k ohm resistor, R20 is a 8.2 k ohm resistor, R21 is a trimable 1 k ohm resistor and capacitor C4 is a 0.1 microfarads capacitor.

Figure 6A:
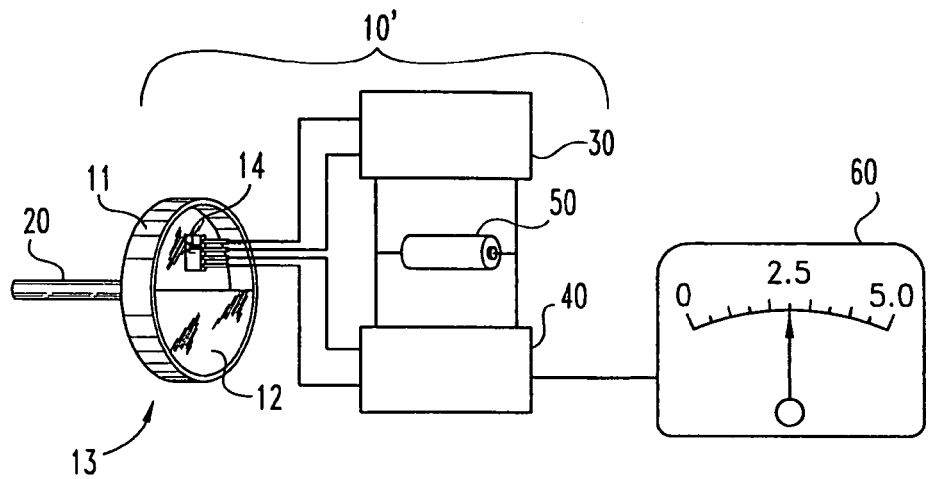
FIG. 6A is a diagrammatic illustration of a reference positioning of a magnetic flux sensor of a preferred embodiment of a magnetic rotational position sensor in accordance with the present invention as adjoined to a control shaft.
Figure 6B:
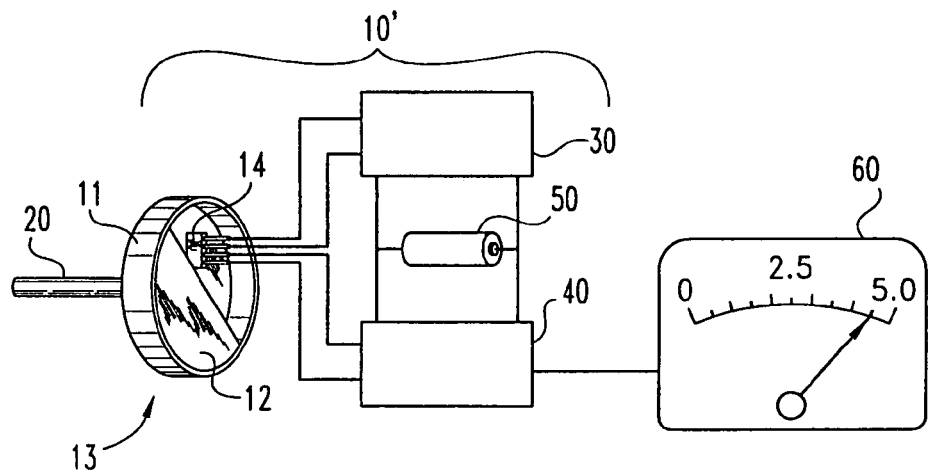
FIG. 6B is a diagrammatic illustration of a clockwise synchronous rotation of a magnetic circuit of the magnetic rotational position sensor of FIG. 6A.
Figure 6C:
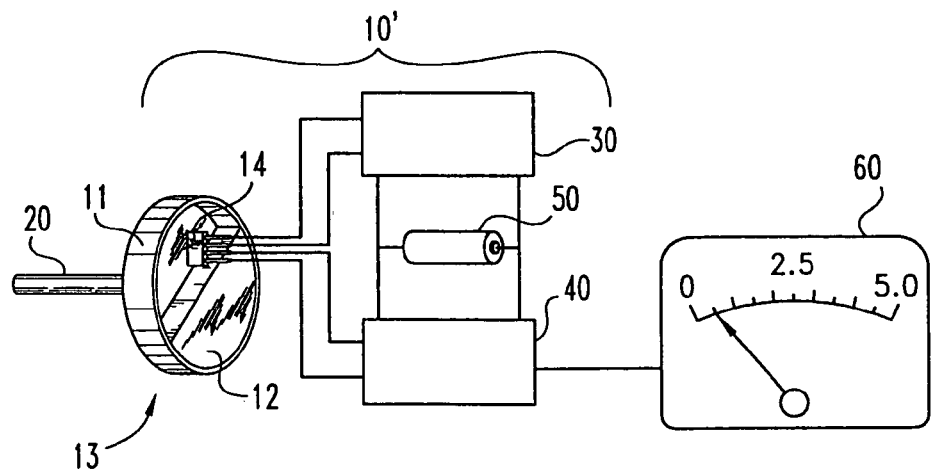
FIG. 6C is a diagrammatic illustration of a counterclockwise synchronous rotation of the magnetic circuit of the magnetic rotational position sensor of FIG. 6A.

Referring to FIGS. 6A-6D, a preferred embodiment of a magnetic rotational position sensor 10' in accordance with the present invention is shown. Magnetic rotational position sensor 10' comprises magnetic circuit 13, Hall effect device 14, drive circuit 30 and output signal amplifier 40 as previously described herein. Magnetic rotational position sensor 10' further comprises a power source 50, e.g. a battery as shown, electrically coupled to drive circuit 30 and output signal amplifier 40 to supply a power signal of 5.0 volts to drive circuit 30 and output signal amplifier 40. The present invention contemplates that at an angular orientation angle θ of zero degrees, voltage sensing signals $V_{SS1}$ and $V_{SS2}$ should be 2.5 volts and output voltage signal $V_{OUT}$ should be 2.5 volts as indicated on a voltmeter 60 as shown in FIG. 6A. It is to be appreciated and understood that Hall effect device 14 can have manufacturing anomalies that offsets voltage sensing signals $V_{SS1}$ and $V_{SS2}$ and output voltage signal $V_{out}$ from 2.5 volts. Thus, resistor R3 of drive circuit 30, and resistors R11 and R12 of output signal amplifier 40 are trimmed as necessary to transform the values of voltage sensing signals $V_{SS1}$ and $V_{SS2}$ and output voltage signal $V_{out}$ to 2.5 volts. It is to be further appreciated and understood that thermistor TR of output signal amplifier 40 will maintain the value of output voltage signal $V_{OUT}$ to 2.5 volts over a temperature range of approximately −40° Celsius and 150° Celsius. As a result, at an angular orientation angle θ of +eighty (80) degrees, voltage sensing signals $V_{S1}$ is 4.5 volts and $V_{S2}$ is 0.5 volts, and output voltage signal $V_{OUT}$ is 4.5 volts as indicated on voltmeter 60 as shown in FIG. 6B, and at an angular orientation angle θ of eighty (80) degrees, voltage sensing signals $V_{S1}$ is 0.5 volts and $V_{S2}$ is 4.5 volts, and output voltage signal $V_{OUT}$ is 0.5 volts as indicated on voltmeter 60 as shown in FIG. 6C. It is to be appreciated and understood that output voltage signal $V_{OUT}$ varies linearly between 0.5 volts and 4.5 volts, and increases and decreases at a rate of 0.025 volts per full degree of rotation of control shaft 20. As a result, output voltage signal $V_{OUT}$ can be easily processed by a microprocessor based system to control all rotational movements of control shaft 20 about the first rotational axis.

Figure 7:
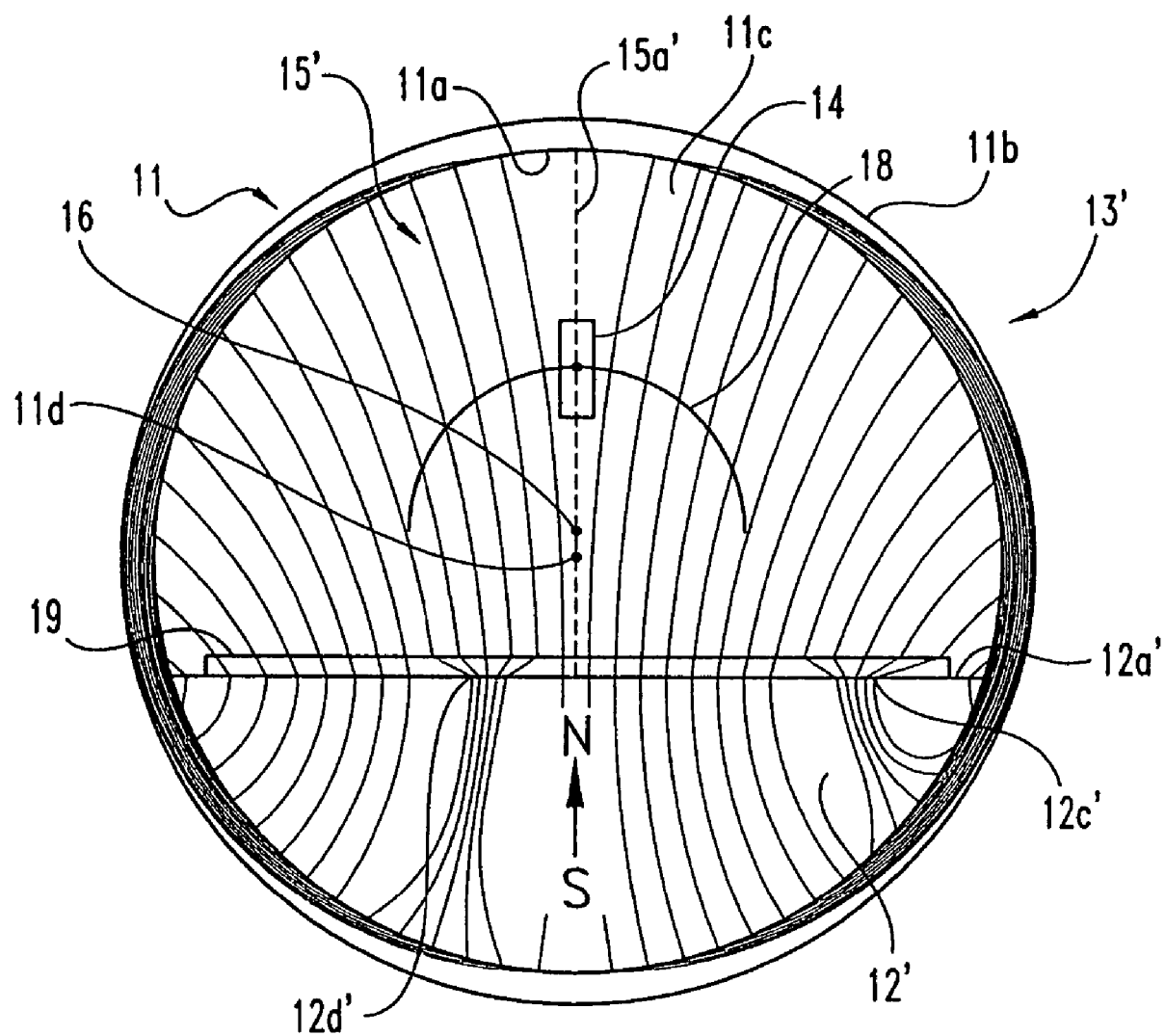
FIG. 7 is a diagrammatic illustration of an alternative embodiment of the magnetic circuit of FIGS. 2A-2C in accordance with the present invention.

As previously described herein in reference to FIGS. 1A-1D and accompanying text, magnetic circuit 13 includes an injection molded rare earth magnet 12 having a substantially semi-circular configuration that is void of any magnetic flux density "hot spots" along both pole surfaces 12a and 12b. Typically, such magnets are difficult to manufacture. Accordingly, an alternative embodiment of a magnetic circuit 13' in accordance with the present invention is shown in FIG. 7. Referring to FIG. 7, magnetic circuit 13' includes loop pole piece 11 and a magnet 12' of a semi-circular configuration having a first magnetic flux density hot spot 12c' and a second magnetic flux density hot spot 12d' on a north pole surface 12a'. It is to be appreciated and understood that hot spots 12c' and 12d' hinders an equally balanced magnetic field throughout air gap area 11c. Thus, magnetic circuit 13' further includes a diffusion plate 19 adjacent north pole surface 12a' of magnet 12' to create and maintain an equally balance magnetic field 15' throughout air gap area 11c.

Figure 8:
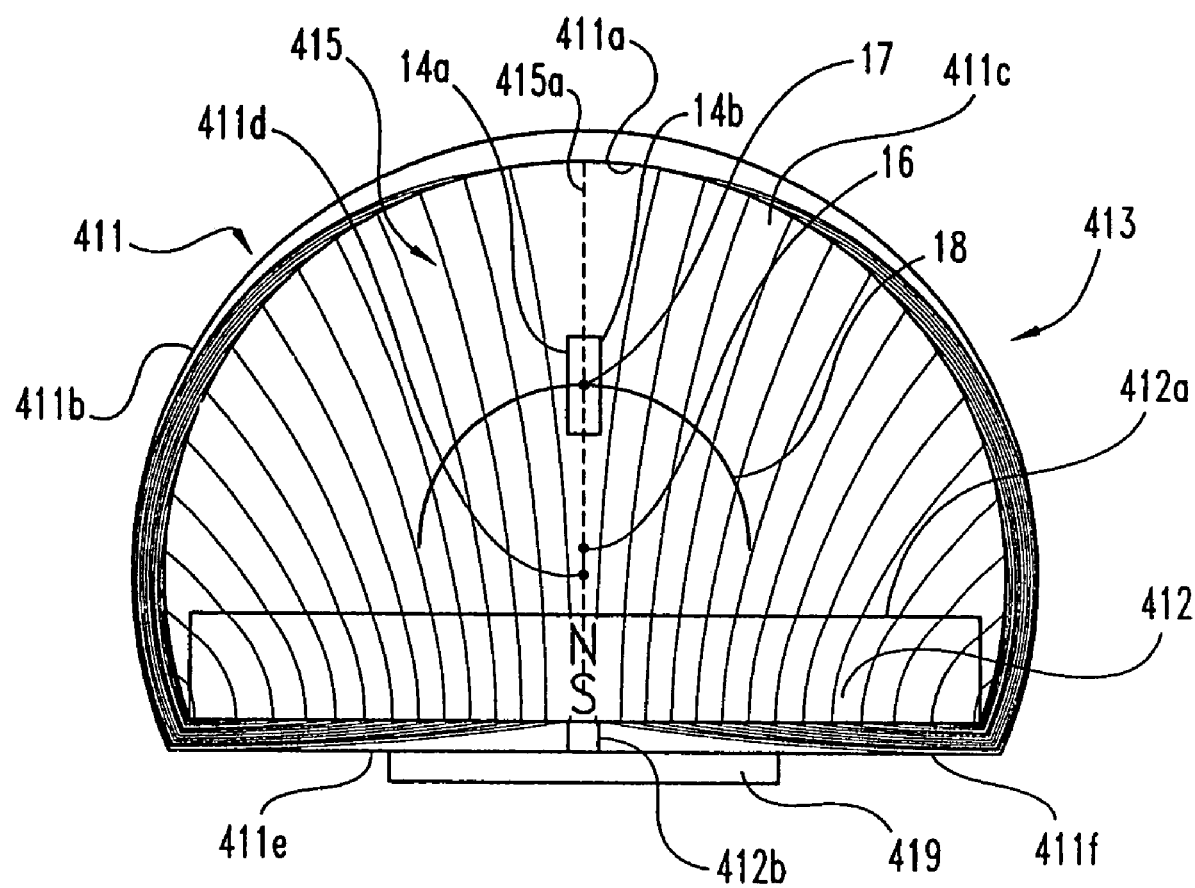
FIG. 8 is a diagrammatic illustration of an alternative embodiment of the magnetic circuit of FIG. 3A in accordance with the present invention.

As defined herein in reference to FIGS. 1A-1D and accompanying text, a loop pole piece can be any combination of manufactured magnetizable articles that has a closed configuration defining an air gap area. FIG. 8 is an example of such a loop pole piece. Referring to FIG. 8, a magnetic circuit 413 includes a first pole piece 411 of an opened dome configuration, and a second pole piece 419 having a rectangular prism configuration adjoined to a portions 411e and 411f of pole piece 411 to close first pole piece 411, thus defining an air gap area 411c. Magnetic circuit 413 further includes a magnet 412 disposed within air gap area 411c with a north pole surface 412a facing and spaced from an inner diameter surface 411a of pole piece 411 and a south pole surface adjoined to a portion 411e and a portion 411f of pole piece 411 to generate a magnetic field 415. Pole piece 419 is properly aligned along portions 411e and 411f to equally balance enclosed magnetic field 415 throughout air gap area 411c.

Figure 9:
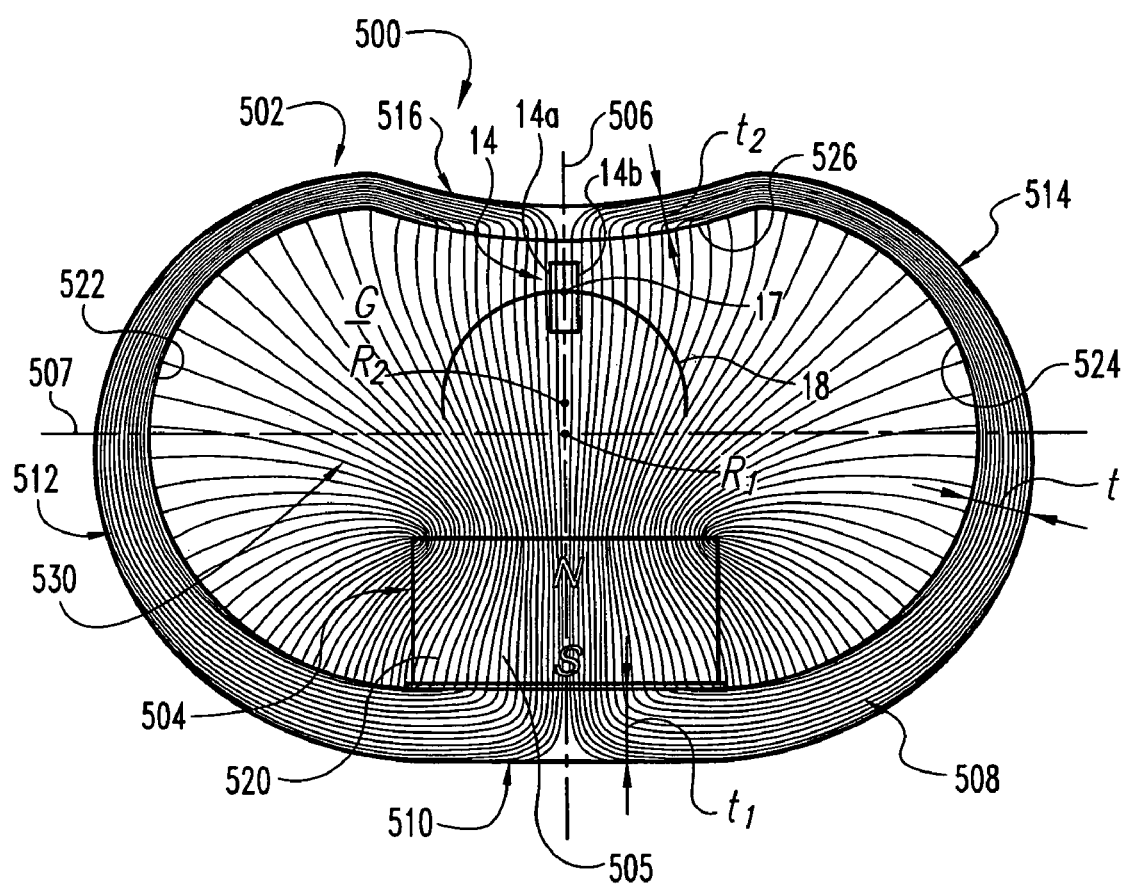
FIG. 9 is a diagrammatic illustration of a magnetic rotational position sensor according to another embodiment of the present invention.

Referring to FIG. 9, shown therein is a magnetic rotational position sensor 500 according to another form of the present invention. The magnetic rotational position sensor 500 includes a magnetic circuit generally comprised of a loop pole piece 502 and a magnet 504 arranged generally along a central axis 506. Similar to the magnetic rotational position sensor embodiments illustrated and described above, the magnetic rotational position sensor 500 is adapted to sense rotation of a control shaft (e.g., control shaft 20) about an axis of rotation $R_1$ with minimal magnetic hysteresis. The magnetic rotational position sensor 500 is preferably adapted to sense rotation of a control shaft about the axis of rotation $R_1$ over a one-hundred and eighty (180) degree range of rotation. However, other ranges of rotation are also contemplated as falling within the scope of the present invention.

The loop pole piece 502 includes a peripheral outer wall 608 extending about an inner air gap area G within which the magnet 504 is disposed. The magnet 504 is preferably polarized in a direction extending generally along the central axis 506. However, it should be understood that other polarization configurations are also contemplated as falling within the scope of the present invention. In one embodiment of the invention, the loop pole piece 502 has a closed configuration defined by a continuous, uninterrupted peripheral outer wall 608. However, it should be understood that in other embodiments of the invention, the outer wall 608 may be peripherally interrupted at one or more locations, as illustrated and described in U.S. Pat. No. 6,417,664 to Ventroni et al., the contents of which are hereby incorporated by reference in their entirety.

The loop pole piece 502 has a non-circular or non-diametric configuration. More specifically, the loop pole piece 502 includes a base portion 510 arranged along the central axis 506, a pair of outwardly projecting portions 512 and 514 extending laterally from the base portion 510 and disposed on opposite sides of the central axis 506, and an inwardly projecting portion 516 disposed between the outwardly projecting portions 512, 514 and arranged generally along the central axis 506. The loop pole piece 502 is preferably substantially symmetrical relative to the central axis 506. In the illustrated embodiment of the invention, the loop pole piece 502 has an oblong or elliptical configuration, defining a transverse dimension along a transverse axis 507 that is greater than an axial dimension along the central axis 506. Although the loop pole piece 502 has been illustrated and described as having a specific shape and configuration, it should be understood that other shapes and configurations are also contemplated as falling within the scope of the present invention.

The base portion 510, the outwardly projecting portions 512 and 514, and the inwardly projecting portion 516 cooperate to define the inner air gap G. The magnet 504 is disposed within the air gap G adjacent the base portion 510 of the loop pole piece 502, with the south pole S of the magnet 504 positioned adjacent the base portion 510 and the north pole N of the magnet 504 facing the air gap G. However, it should be understood that the orientation of the magnet 504 may be reversed, with the north pole N disposed adjacent the base portion 510 and the south pole S facing the air gap G. In the illustrated embodiment of the invention, the magnet 504 has a rectangular configuration, with the base portion 510 of the pole piece 502 having a linear configuration defining a substantially flat inner surface 520 for adjoinment with a corresponding flat surface 505 of the magnet 504. However, it should be understood that other configurations of the magnet 504 and the base portion 510 are also contemplated as falling within the scope of the present invention, including non-rectangular and non-linear configurations, examples of which have been illustrated and described above with regard to other embodiments of the invention.

The outwardly projecting portions 512, 514 of the loop pole piece 502 each preferably have an arcuate configuration defining concave inner surfaces 522, 524, respectively, facing the air gap area G. In one embodiment of the invention, the concave inner surfaces 522, 524 each have a diametric configuration defining a substantially uniform radius of curvature. However, other configurations of the outwardly projecting portions 512, 514 are also contemplated as falling within the scope of the present invention, including non-diametric configurations and non-arcuate configurations, such as, for example, angled configurations or polygonal configurations.

The inwardly projecting portion 516 of the loop pole piece 502 preferably has an arcuate configuration defining a convex inner surface 526 facing the air gap area G. In one embodiment of the invention, the convex inner surface 526 defines a substantially uniform radius of curvature. However, other configurations of the inwardly projecting portion 516 are also contemplated as falling within the scope of the present invention, including non-arcuate configurations, such as, for example, angled configurations or polygonal configurations.

In one embodiment of the invention, the outer wall 608 of the pole piece 502 has a varying material thickness t. More specifically, the base portion 510 of the pole piece 502 adjacent the magnet 504 has a first thickness $t_1$ which transitions to a reduced second thickness $t_2$ adjacent the inwardly extending portion 516. In a preferred embodiment of the invention, the pole piece 502 gradually transitions from the first thickness $t_1$ to the second thickness $t_2$ along the length of the outwardly extending portions 512, 514. As should be appreciated, the thicker portions of the loop pole piece 502 offer a lesser degree of magnetic reluctance than do the thinner portions of the loop pole piece 502. As a result, the portions of the loop pole piece 502 conveying higher levels of magnetic flux density are provided with a greater material thickness t compared to the portions of the loop pole piece 502 conveying lower levels of magnetic flux density.

The loop pole piece 502 and the magnet 504 cooperate to generate a magnetic field 530 within the air gap G. Preferably, the magnetic field 530 is equally balanced relative to the central axis 506 so as to define substantially symmetrical portions of the magnetic field 530 on either side of the central axis 506. A magnetic flux sensor 14 is positioned within the air gap G to sense varying magnitudes of magnetic flux density passing through the sensing planes 14a and 14b upon rotation of the magnetic circuit about an axis of rotation $R_2$. In the illustrated embodiment of the invention, a single magnetic flux sensor 14 is provided to sense varying magnitudes of magnetic flux density within the air gap G. However, in other embodiments of the invention, two or more magnetic flux sensors may be used to sense varying magnitudes of magnetic flux density within the air gap G, an example of which is illustrated and described in U.S. Pat.

No. 6,472,865 to Tola et al., the contents of which are hereby incorporated by reference in their entirety.

In one embodiment of the invention, the axis of rotation $R_2$ of the magnetic circuit is arranged co-axial with the axis of rotation $R_1$ of the control shaft. However, in other embodiments of the invention, the axis of rotation $R_2$ of the magnetic circuit may be offset from the axis of rotation $R_1$ of the control shaft. In a preferred embodiment of the invention, the magnetic flux sensor 14 is arranged along a central axis 17 extending generally along the sensing surfaces 14a, 14b and offset from and arranged substantially parallel to the axis of rotation $R_2$ of the magnetic circuit. As a result, the central axis 17 of the magnetic flux sensor 14 travels along a sensing path 18, extending generally along a radial arc as the magnetic circuit is rotated about the axis of rotation $R_2$. As discussed above, the sensing range of the magnetic rotational position sensor 500 preferably extends over a one-hundred and eighty (180) degree range of rotation. Accordingly, the sensing path 18 also preferably extends along a one-hundred and eighty (180) degree radial arc.

Due to the unique configuration of the loop pole piece 502, the relative density or concentration of the magnetic field lines is increased in the region of the air gap G adjacent the central axis 506 extending between the magnet 504 and the inwardly extending pole piece portion 516. Additionally, the magnetic field lines adjacent the central axis 506 extending between the magnet 504 and the inwardly extending pole piece portion 516 are relatively uniform and are arranged substantially parallel with the central axis 506. As a result, sensitivity associated with the positioning and alignment of the magnetic flux sensor 14 within the air gap G adjacent the central axis 506 is reduced, thereby resulting in increased linearity and decreased hysteresis of sensor signal output.

Figure 10:
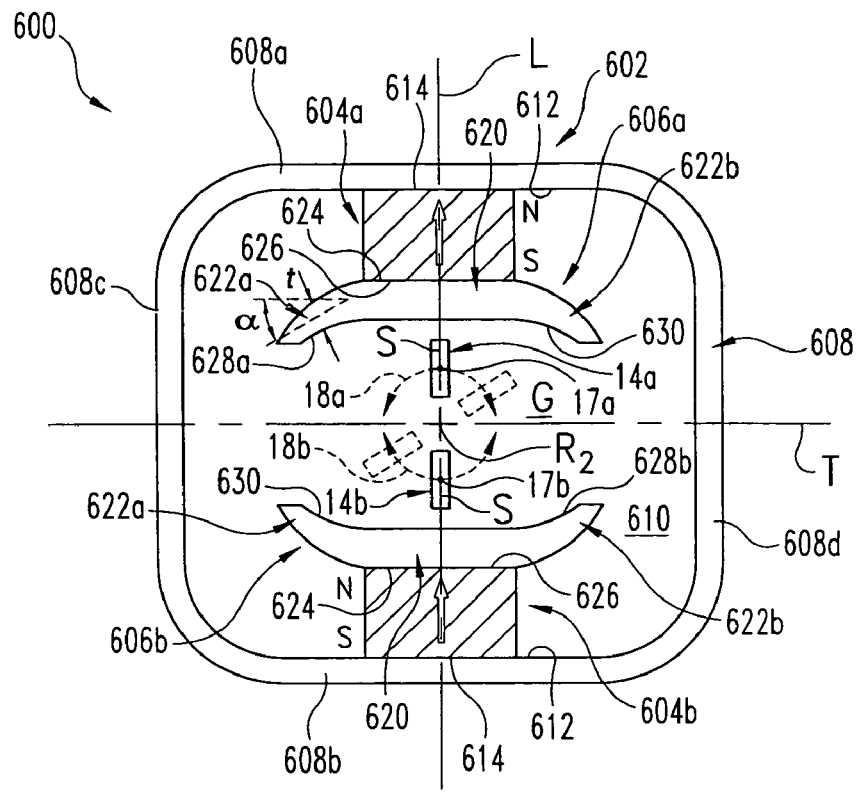
FIG. 10 is a diagrammatic illustration of a magnetic rotational position sensor according to another embodiment of the present invention.
Figure 11:
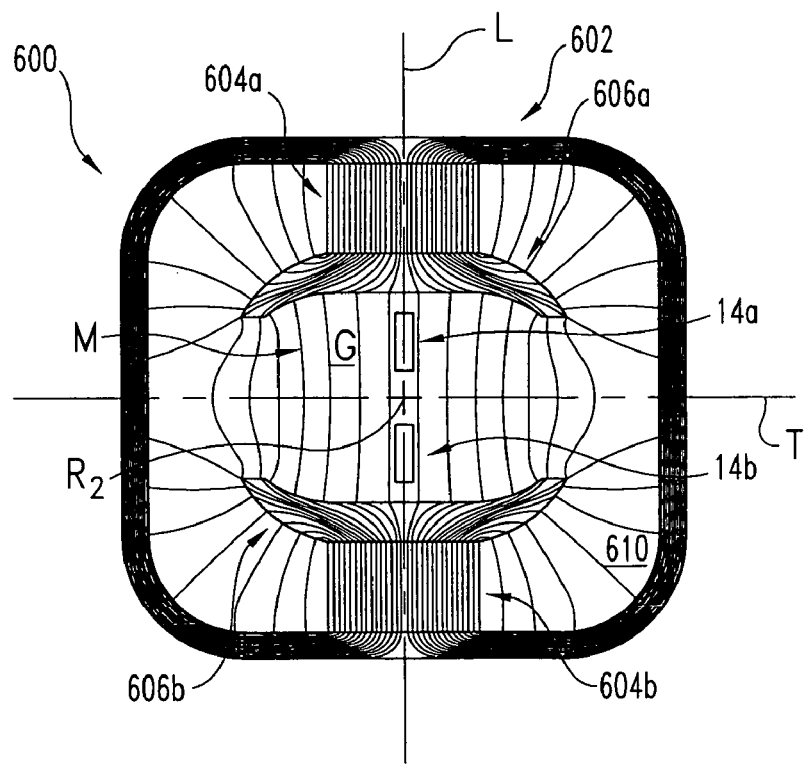
FIG. 11 is a diagrammatic illustration of the magnetic field associated with the magnetic rotational position sensor of FIG. 10.
Figure 14:
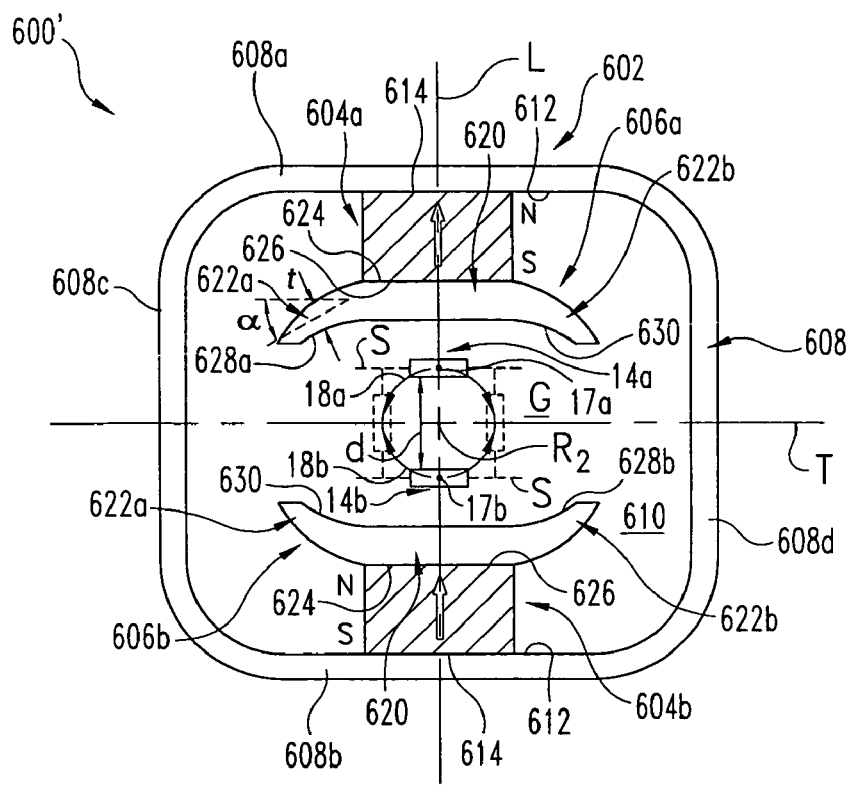
FIG. 14 is a diagrammatic illustration of a magnetic rotational position sensor according to another embodiment of the present invention.
Figure 15:
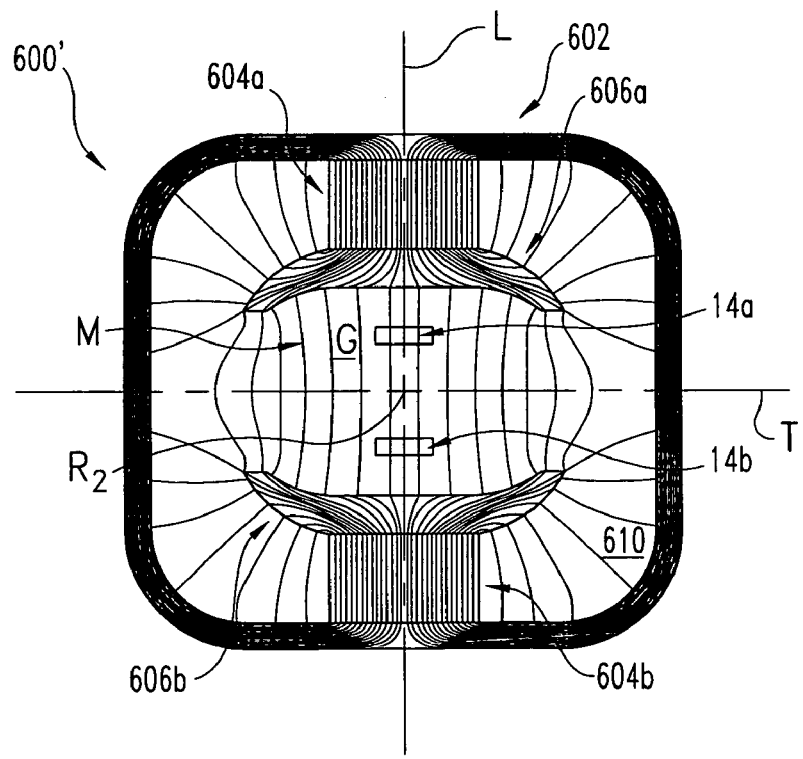
FIG. 15 is a diagrammatic illustration of the magnetic field associated with the magnetic rotational position sensor of FIG. 14.

Referring to FIGS. 10 and 11, shown therein is a magnetic rotational position sensor 600 according to another form of the present invention. Additionally, a similar magnetic rotational position sensor 600' according to a further form of the present invention is shown in FIGS. 14 and 15. The magnetic rotational position sensors 600 and 600' each include a magnetic circuit generally comprised of a loop pole piece 602 and first and second magnets 604a, 604b arranged generally along a central longitudinal axis L and spaced apart to define an air gap G therebetween. It should be understood that the air gap G not only includes the area lying directly between the magnets 604a, 604b along the longitudinal axis L, but also includes the areas laterally adjacent thereto along the transverse axis T. Additionally, the illustrated embodiments of the magnetic rotational position sensors 600 and 600' each include first and second shaped pole pieces 606a, 606b arranged generally along the longitudinal axis L and positioned proximately adjacent the first and second magnets 604a, 604b. Similar to the magnetic rotational position sensor 500 illustrated and described above, the magnetic rotational position sensors 600 and 600' are adapted to sense rotation of a control shaft (e.g., a control shaft 20) about an axis of rotation $R_1$ with minimal magnetic hysteresis. The magnetic rotational position sensors 600 and 600' are preferably adapted to sense rotation of a control shaft about an axis of rotation $R_1$ over a one-hundred and eighty (180) degree range of rotation. However, other ranges of rotation are also contemplated as falling within the scope of the present invention.

The loop pole piece 602 is formed of a magnetic material and serves to enhance/intensify the magnetic field levels generated by the magnetic circuit by providing a return path for the magnetic flux generated by the magnets 604a, 604b. Additionally, the loop pole piece 602 serves to shield the magnetic circuit from any magnetic fields existing outside of the sensor 600 to prevent or at least minimize magnetic hysteresis and/or magnetic or electrical interferences. In one embodiment, the loop pole piece 602 includes a peripheral outer wall 608 defining an inner region 610 within which the magnets 604a, 604b are positioned. In another embodiment, the magnets 604a, 604b are each polarized in a direction extending generally along the longitudinal axis L. In the illustrated embodiment, the magnets 604a, 604b are polarized in the same general direction. However, it should be understood that other polarization configurations and arrangements are also contemplated as falling within the scope of the present invention. In a further embodiment of the invention, the loop pole piece 602 has a closed configuration defined by a continuous, uninterrupted peripheral outer wall 608. However, it should be understood that in other embodiments of the invention, the outer wall 608 of the loop pole piece 602 may be peripherally interrupted at one or more locations, as illustrated and described in U.S. Pat. No. 6,417,664 to Ventroni et al., the contents of which are hereby incorporated by reference in their entirety.

In the illustrated embodiments of the invention, the loop pole piece 602 has a non-circular or non-diametric configuration. More specifically, the loop pole piece 602 has a rectangular-shaped or square-shaped configuration including a first pair of opposite wall portions 608a, 608b arranged substantially parallel to one another, and a second pair of opposite wall portions 608c, 608d arranged substantially parallel to one another. The first pair of opposite wall portions 608a, 608b extends generally along the transverse axis T while the second pair of opposite wall portions 608c, 608d extends generally along the longitudinal axis L between the first pair of opposite wall portions 608a, 608b. In one embodiment, the corners between the adjacent wall portions are rounded. Additionally, the loop pole piece 602 is preferably substantially symmetrical relative to both the longitudinal axis L and the transverse axis T. However, non-symmetrical configurations are also contemplated as falling within the scope of the present invention. Although the loop pole piece 602 has been illustrated and described as having a specific shape and configuration, it should be understood that other shapes and configurations are also contemplated as falling within the scope of the present invention. For example, the loop pole piece 602 may have circular or diametric configurations, oblong or elliptical configurations, angular or polygonal configurations, or any other shape or configuration that would occur to one of skill in the art.

In a preferred embodiment of the present invention, the magnets 604a, 604b are rare earth magnets and each has a substantially rectangular configuration. This particular type of magnet is relatively common, thereby increasing sourcing opportunities and reducing the overall cost of the magnetic circuit. However, it should be understood that other shapes and configurations of the magnets 604a, 604b are also contemplated as falling within the scope of the present invention, including a square shape, irregular shapes, and non-rectangular and non-linear configurations, examples of which have been illustrated and described above with regard to other embodiments of the invention.

The magnets 604a, 604b are disposed within the inner region 610 of the loop pole piece 602 and are positioned adjacent the opposite wall portions 608a, 608b, respectively, with the north pole N of the magnet 604a positioned adjacent the wall portion 608a and the south pole S of the magnet 604b positioned adjacent the wall portion 608b.

However, it should be understood that the orientation of one or both of the magnets 604a, 604b relative to the wall portions 608a, 608b may be reversed. In the illustrated embodiment of the invention, the wall portions 608a, 608b of the pole piece 602 each have a linear configuration defining a substantially flat inner surface 612 adapted for adjoinment with a corresponding flat surface 614 of the magnets 604a, 604b. However, it should be understood that other configurations of the wall portions 608a, 608b are also contemplated as falling within the scope of the present invention. Additionally, although the magnetic circuit is illustrated and described as including a pair of magnets 604a, 604b, it should be understood that the magnetic circuit may include any number of magnets, including a single magnet or three or more magnets.

In one embodiment of the invention, the shaped pole pieces 606a, 606b are formed of cold rolled steel (CRS). However, it should be understood that other suitable materials are also contemplated as falling within the scope of the present invention. The pole pieces 606a, 606b are positioned adjacent the magnets 604a, 604b, respectively, and include inwardly facing surfaces 628a, 628b that face the air gap G. The shaped pole pieces 606a, 606b cooperate with the magnets 604a, 604b to generate a magnetic field M (FIGS. 11 and 15) extending across the air gap G. As will be discussed below, in one embodiment of the invention, the magnetic field M is substantially symmetrical relative to the longitudinal axis L and relative to the transverse axis T. As a result, the magnetic field M is balanced relative to the axis of rotation $R_2$.

In the illustrated embodiment, the shaped pole pieces 606a, 606b each have a non-rectangular or irregular shape. In one embodiment, each of the shaped pole pieces 606a, 606b has a generally curved or arcuate configuration including a central portion 620 positioned adjacent a respective one of the magnets 604a, 604b and a pair of side portions or wings 622a, 622b extending transversely and laterally beyond the respective magnet 604a, 604b. Although the shaped pole pieces 606a, 606b have been illustrated and described as having a particular shape and configuration, it should be understood that other shapes and configurations of the pole pieces 606a, 606b are also contemplated as falling within the scope of the present invention. Additionally, in a further embodiment, the shaped pole pieces 606a, 606b are each formed as a single-piece, unitary structure. However, it should be understood that in other embodiments, the shaped pole pieces 606a, 606b may each be formed from separate/discrete elements that are subsequently interconnected to form an integrated pole piece structure. Furthermore, although the magnetic circuit is illustrated and described as including a pair of the shaped pole pieces 606a, 606b, it should be understood that in other embodiments of the invention, the magnetic circuit need not necessarily include any shaped pole pieces.

The central portion 620 of the shaped pole pieces 606a, 606b preferably has a linear configuration defining a substantially flat outer surface 624 for adjoinment with a corresponding flat surface 626 defined by a respective one of the magnets 604a, 604b. However, it should be understood that the central portion 620 may take on other configurations as well, such as, for example, a curved or arcuate configuration. The side portions 622a, 622b preferably have substantially the same configuration and are preferably arranged symmetrical to one another relative to the longitudinal axis L. In the illustrated embodiment, the side portions 622a, 622b have a curved or arcuate configuration defining a concave or radial inner surface 630 facing the air gap G.

Additionally, the side portions 622a, 622b have a reduced or tapering thickness t as the side portions 622a, 622b extend laterally outward from the central portion 620. Furthermore, the side portions 622a, 622b extend outwardly from the central portion 620 at an angle α. In one embodiment, the side portions 622a, 622b extend from the central portion 620 at an angle α falling within a range of zero degrees to ninety degrees. In a further embodiment, the side portions 622a, 622b extend from the central portion 620 at an angle α of about thirty degrees to about sixty degrees, and in a specific embodiment extend from the central portion 620 at an angle α of about forty-five degrees. Although a specific configuration of the side portions 622a, 622b has been illustrated and described herein, it should be understood that the side portions 622a, 622b may take on other configurations as well.

In a preferred embodiment of the invention, the shaped pole pieces 606a, 606b are configured and arranged in a substantially symmetrical relationship relative to both the longitudinal axis L and the transverse axis T. As a result, the magnets 604a, 604b and the shaped pole pieces 606a, 606b cooperate to generate a balanced magnetic field M within the air gap G that is also substantially symmetrical relative to both the longitudinal axis L and the transverse axis T (FIGS. 11 and 15). In other words, the portion of the magnetic field on one side of the longitudinal axis L is virtually a mirror image of the portion of the magnetic field on the opposite side of the longitudinal axis L. Similarly, the portion of the magnetic field on one side of the transverse axis T is virtually a mirror image of the portion of the magnetic field on the opposite side of the transverse axis T.

With regard to each embodiment of the magnetic rotational position sensors 600 and 600', a pair of magnetic flux sensors 14a, 14b is positioned within the air gap G to sense varying magnitudes of magnetic flux density passing through the sensing planes S as the magnetic field M is rotated about the axis of rotation $R_2$. The magnetic flux sensors 14a, 14b in turn generate an electronic signal, such as a voltage signal, that is proportional to the magnitude of the sensed magnetic flux density. Preferably, the magnetic field strength or flux density sensed by the magnetic flux sensors 14a, 14b is proportional to the rotational position/orientation of the sensors 14a, 14b relative to the magnetic circuit and the magnetic field M. Additionally, the voltage signal generated by the magnetic flux sensors 14a, 14b is preferably substantially linear over a predetermined range of rotational travel and exhibits minimal magnetic hysteresis.

Although the magnetic rotational position sensors 600 and 600' are illustrated and described herein as including a pair of magnetic flux sensors 14a, 14b, it should be understood that one or three or more magnetic flux sensors may be used to sense varying magnitudes of magnetic flux density within the air gap G. In a preferred embodiment of the invention, the magnetic flux sensors 14a, 14b are Hall devices that function to sense varying magnitudes of magnetic flux density in directions substantially perpendicular to the sensing plane S. However, other types and configurations of magnetic flux sensors are also contemplated as would occur to one of skill in the art including, for example, MR-type sensors.

In the illustrated embodiment of the invention, the magnetic flux sensors 14a, 14b are arranged along sensor axes 17a, 17b, respectively, which extend generally along respective ones of the sensing planes S. Additionally, the sensor axes 17a, 17b are each offset from and arranged substantially parallel to the axis of rotation $R_2$ of the magnetic circuit. In a preferred embodiment of the invention, the sensor axes 17a, 17b are arranged on diametrically opposite sides of the axis of rotation $R_2$ and are offset from the axis of rotation $R_2$ by an equal distance. As a result, the sensor axes 17a, 17b of the magnetic flux sensors 14a, 14b travel along substantially identical sensing paths 18a, 18b which extend along a common radius as the magnetic circuit is rotated about the axis of rotation $R_2$. Additionally, the sensing range of each of the magnetic rotational position sensors 600 and 600' preferably extends over a one-hundred and eighty (180) degree range of rotation. Accordingly, the sensing paths 18a, 18b may also extend along a one-hundred and eighty (180) degree radial arc. In one embodiment, the axis of rotation $R_2$ of the magnetic circuit is arranged co-axial with the axis of rotation $R_1$ of the control shaft. However, in other embodiments of the invention, the axis of rotation $R_2$ of the magnetic circuit may be offset from the axis of rotation $R_1$ of the control shaft.

With regard to the magnetic rotational position sensor 600, the flux sensors 14a, 14b are positioned such that the sensing planes S are arranged in a co-planar relationship, with the sensing planes S preferably intersecting the axis of rotation $R_2$. With regard to the magnetic rotational position sensor 600', the flux sensors 14a, 14b are positioned such that the sensing planes S are arranged in a parallel and offset relationship, with the sensing planes S arranged on opposite sides of the axis of rotation $R_2$. Although the magnetic rotational position sensor 600' illustrates the flux sensors 14a, 14b as being offset from one another by a distance d, it should be understood that the flux sensors 14a, 14b may be positioned such that their inwardly facing surfaces are arranged proximately adjacent one another or in an abutting relationship (i.e., wherein the distance d is zero).

Due to the unique configuration and positioning of the shaped pole piece 606a, 606b, the density or concentration of the magnetic field within the air gap G is relatively uniform, with the magnetic field lines extending generally parallel with the longitudinal axis L and providing a generally symmetrical magnetic field M relative to both the longitudinal axis L and the transverse axis T. As should be appreciated, as the magnetic circuit is rotated about the axis of rotation $R_2$, the angular orientation of the magnetic flux sensors 14a, 14b relative to the magnetic field M will correspondingly change so as to sense varying magnitudes of magnetic flux density passing through the sensing planes S (i.e., the normal magnetic flux passing perpendicularly through the sensing planes S). Additionally, since the magnetic field lines extending along the longitudinal axis L are relatively uniform and are arranged substantially parallel with the longitudinal axis L, the sensitivity associated with the positioning and alignment of the magnetic flux sensors 14a, 14b within the air gap G is reduced, thereby resulting in increased linearity and decreased hysteresis of sensor signal output.

As should also be appreciated, since the magnetic field M is generally uniform and symmetrical relative the longitudinal axis L, the sensed magnitude of magnetic flux will vary in a substantially linear manner as the magnetic field M is rotated about the axis of rotation $R_2$, with the sensed magnitude of magnetic flux density being approximately zero when the sensing planes S are arranged substantially parallel with the longitudinal axis L. As should further be appreciated, since the magnetic field M is substantially uniform and symmetrical relative the longitudinal axis L and the transverse axis T, the magnitude of magnetic flux sensed by the magnetic flux sensor 14a will be substantially equal to that sensed by magnetic flux sensor 14b arranged diametrically opposite the magnetic flux sensor 14a. As a result, the magnetic flux sensors 14a, 14b may be used to generate substantially equal or redundant output signals that correspond to the particular rotational position of the sensors 14a, 14b along the radial sensing paths 18a, 18b relative to the magnetic field M, which in turn corresponds to the particular rotational position of the control shaft 20.

In one embodiment of the invention, the magnetic flux sensors 14a, 14b remain in a stationary position while the magnetic field M generated by the magnetic circuit is rotated about the axis of rotation $R_2$. However, in another embodiment of the invention, the magnetic field M remains in a stationary position while the magnetic flux sensors 14a, 14b are rotated about the axis of rotation $R_2$. In still another embodiment of the invention, the magnetic flux sensors 14a, 14b and the magnetic field M may both be rotated about the axis of rotation $R_2$, either at different rates and/or in opposite directions relative to one another.

Figure 12:
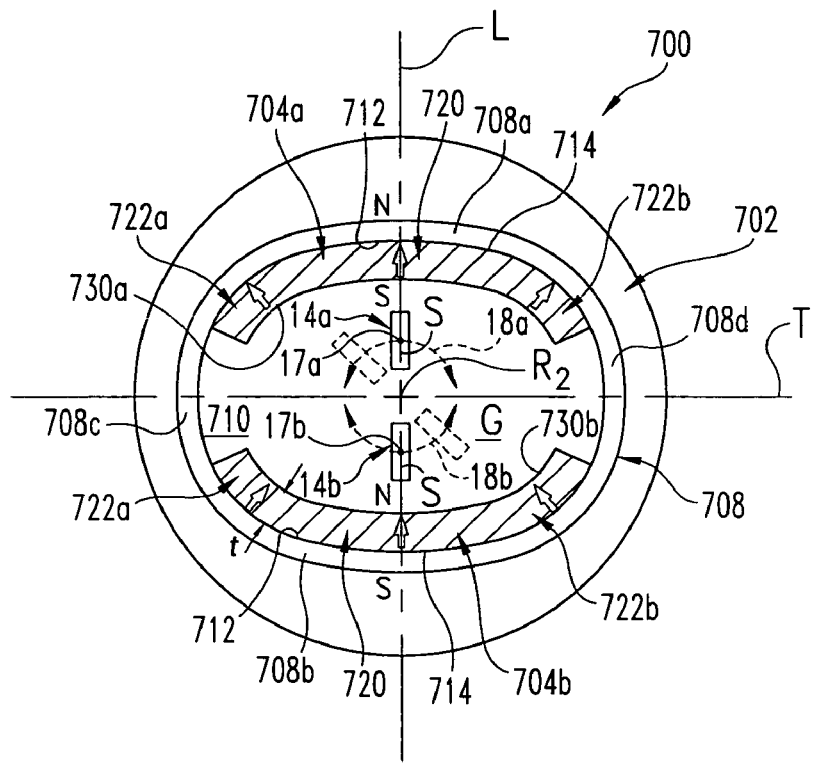
FIG. 12 is a diagrammatic illustration of a magnetic rotational position sensor according to another embodiment of the present invention.
Figure 13:
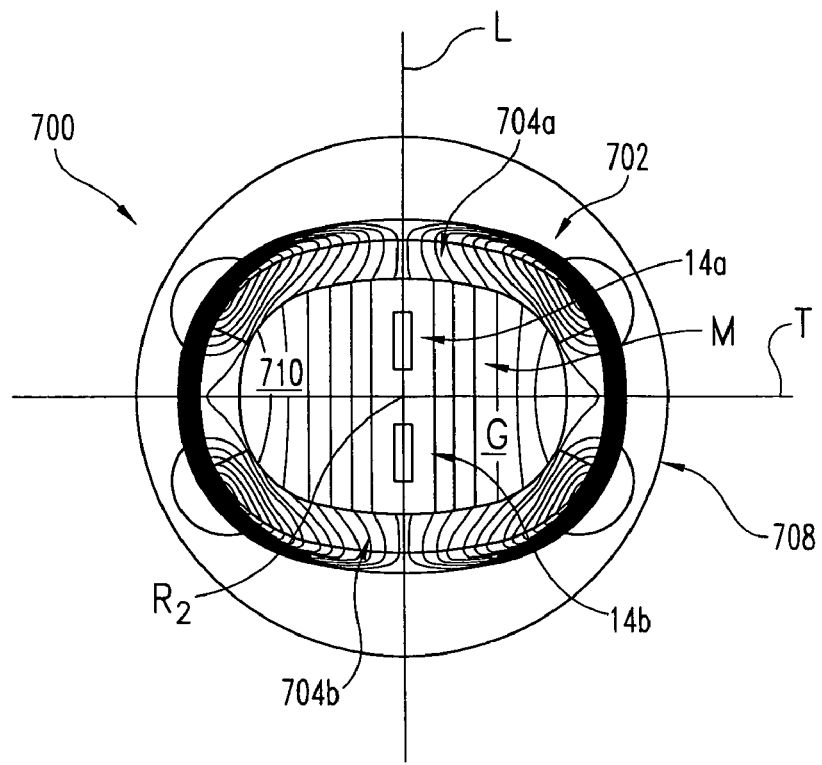
FIG. 13 is a diagrammatic illustration of the magnetic field associated with the magnetic rotational position sensor of FIG. 12.
Figure 16:
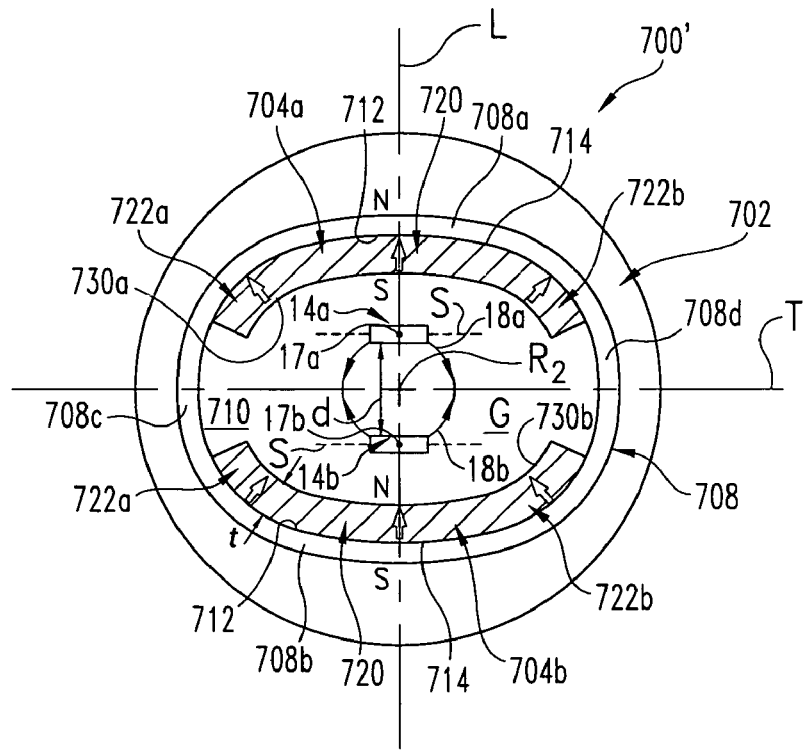
FIG. 16 is a diagrammatic illustration of a magnetic rotational position sensor according to another embodiment of the present invention.
Figure 17:
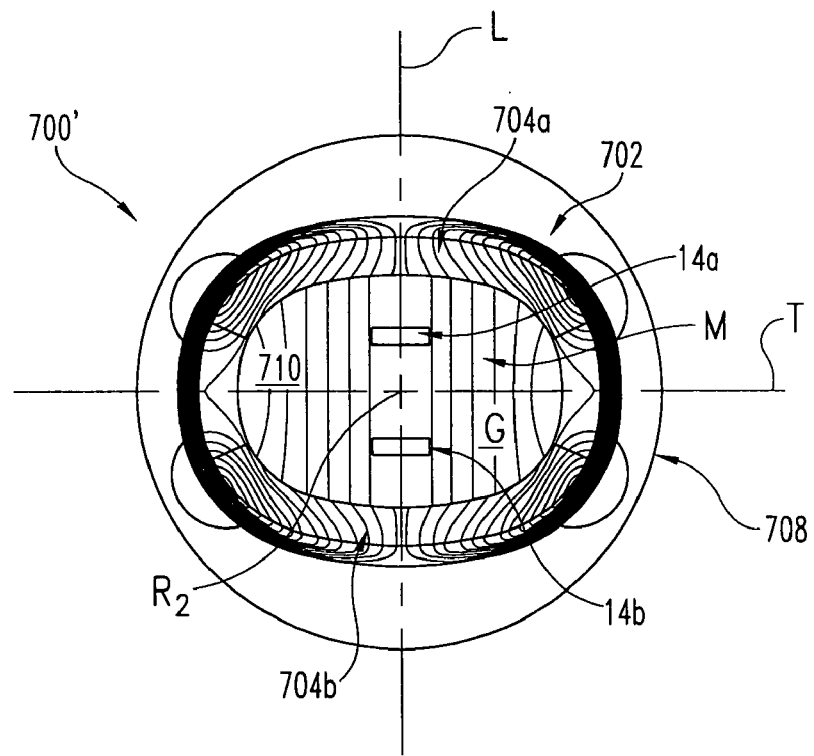
FIG. 17 is a diagrammatic illustration of the magnetic field associated with the magnetic rotational position sensor of FIG. 16.

Referring now to FIGS. 12 and 13, shown therein is a magnetic rotational position sensor 700 according to another form of the present invention. Additionally, a similar magnetic rotational position sensor 700' according to a further form of the present invention is shown in FIGS. 16 and 17. The magnetic rotational position sensors 700 and 700' each include a magnetic circuit generally comprised of a loop pole piece 702 and first and second shaped magnets 704a, 704b centrally arranged relative to a longitudinal axis L and extending generally along a transverse axis T. The magnets 704a, 704b are spaced apart to define an air gap G therebetween. It should be understood that the air gap G not only includes the area lying directly between the magnets 704a, 704b along the longitudinal axis L, but also includes the areas laterally adjacent thereto along the transverse axis T. Additionally, although the illustrated embodiments of the sensors 700 and 700' do not include shaped pole pieces that cooperate with the shaped magnets 704a, 704b in a manner similar to that described about with regard to the rotational position sensors 600 and 600', it should be understood that the use of shaped pole pieces is also contemplated as falling within the scope of the present invention.

Similar to the magnetic rotational position sensor 500 illustrated and described above, the magnetic rotational position sensors 700 and 700' are adapted to sense rotation of a control shaft (e.g., control shaft 20) about an axis of rotation $R_1$ with minimal magnetic hysteresis. Additionally, the magnetic rotational position sensors 700 and 700' are preferably adapted to sense rotation of a control shaft about the axis of rotation $R_1$ over a one-hundred and eighty (180) degree range of rotation. However, other ranges of rotation are also contemplated as falling within the scope of the present invention. In the illustrated embodiment of the invention, the loop pole piece 702 and the first and second shaped magnets 704a, 704b are attached to a rotor portion 708. The rotor portion 708 is in turn coupled to the control shaft 20 (not shown) such that rotation of the control shaft 20 rotates the rotor portion 208 which in turn rotates the magnetic circuit (including the magnetic field M) about the axis of rotation $R_2$. It should be understood that in other embodiments of the invention, the position sensors 700 and 700' need not necessarily include a separate rotor portion 208.

The loop pole piece 702 is formed of a magnetic material and serves to enhance/intensify the magnetic field levels generated by the magnetic circuit by providing a return path for the magnetic flux generated by the shaped magnets 704a, 704b. Additionally, the loop pole piece 702 serves to shield the magnetic circuit from any magnetic fields existing outside of the sensors 700 and 700' to prevent or at least minimize magnetic hysteresis and/or magnetic or electrical interferences. In one embodiment, the loop pole piece 702 includes a peripheral outer wall 708 defining an inner region 710 within which the shaped magnets 704a, 704b are positioned. In the illustrated embodiment, the shaped magnets 704a, 704b are each polarized in directions substantially normal to the respective pole surfaces 730a, 730b facing the air gap G. In an alternative embodiment, the shaped magnets 704a, 704b may be polarized in the same overall longitudinal direction. Additionally, it should be also understood that other polarization configurations and arrangements are also contemplated as falling within the scope of the present invention. In a further embodiment of the invention, the loop pole piece 702 has a closed configuration defined by a continuous, uninterrupted peripheral outer wall 708. However, it should be understood that in other embodiments, the outer wall 708 of the loop pole piece 702 may be peripherally interrupted at one or more locations.

In the illustrated embodiment of the invention, the loop pole piece 702 has a non-circular or non-diametric configuration. More specifically, the loop pole piece 702 has an oval or elliptical configuration, including a first pair of opposite wall portions 708a, 708b extending generally along the transverse axis T and a second pair of opposite wall portions 708c, 708d extending generally along the longitudinal axis L between the first pair of opposite wall portions 708a, 708b. In one embodiment, each of the wall portions 708a, 708b and 708c, 708d has a curved or arcuate configuration and the loop pole piece 702 has a transverse dimension (along axis T) that is somewhat greater than an axial dimension (along axis L) so as to provide the loop pole piece 702 with an oblong configuration having an oval or elliptical shape. Additionally, the loop pole piece 702 is preferably substantially symmetrical relative to the longitudinal axis L and the transverse axis T, although non-symmetrical configurations are also contemplated. Although the loop pole piece 702 has been illustrated and described as having a specific shape and configuration, it should be understood that other shapes and configurations are also contemplated as falling within the scope of the present invention. For example, the loop pole piece 702 may have circular or diametric configurations, rectangular or square configurations, angular or polygonal configurations, or any other shape or configuration that would occur to one of skill in the art. In one alternative embodiment, the loop pole piece has a rectangular or square configuration and the magnetic circuit includes shaped magnets having planar pole surfaces that are positioned proximately adjacent to or in abutment with opposite linear wall portions of the rectangular loop pole piece. In this alternative embodiment, the shaped magnets may define pole surfaces facing the air gap which have an arcuate configuration, such as a concave curvature, or a planar configuration.

In one embodiment of the invention, the shaped magnets 704a, 704b are rare earth magnets and each have a curved or arcuate configuration that generally corresponds to the curved or arcuate shape associated with the wall portions 708a, 708b of the loop pole piece 702. In the illustrated embodiment, the shaped magnets 704a, 704b define concave inner pole surfaces 730a, 730b, respectively, which face the air gap G. Additionally, the shaped magnets 704a, 704b have a strip or bar-like configuration extending along the curved inner perimeter of the loop pole piece 702 and having a substantially uniform thickness t. In this manner, the shaped magnets 704a, 704b may be said to have a peripheral or arc-shaped configuration defining a segment of an annular ring. However, other shapes and configurations of magnets are also contemplated for use in association with the present invention.

In a further embodiment of the invention, the shaped magnets 704a, 704b are configured and arranged in a substantially symmetrical relationship relative to both the longitudinal axis L and the transverse axis T. As a result, the shaped magnets 704a, 704b cooperate with one another to generate a balanced magnetic field M extending across the air gap G that is also substantially symmetrical relative to both the longitudinal axis L and the transverse axis T (FIGS. 13 and 17). In other words, the portion of the magnetic field on one side of the longitudinal axis L is virtually a mirror image of the portion of the magnetic field on the opposite side of the longitudinal axis L. Similarly, the portion of the magnetic field on one side of the transverse axis T is virtually a mirror image of the portion of the magnetic field on the opposite side of the transverse axis T. As a result, the magnetic field M is balanced relative to the axis of rotation $R_2$, the purpose of which will be discussed below.

In one embodiment of the invention, each of the shaped magnets 704a, 704b extends about approximately one-sixth to one-half of the overall perimeter of the loop pole piece 702. In a further embodiment, each of the shaped magnets 704a, 704b extends about approximately one-forth to one-third of the overall perimeter of the loop pole piece 702. In a specific embodiment, the combined length of the shaped magnets 704a, 704b extends about approximately three-quarters of the overall perimeter of the loop pole piece 702. However, other dimensional configurations of the shaped magnets 704a, 704b are also contemplated as falling within the scope of the present invention. The shaped magnets 704a, 704b may be formed by bending or otherwise deforming a standard rectangular-shaped magnet, thereby increasing sourcing opportunities and reducing the overall cost of the magnetic circuit.

The opposite wall portions 708a, 708b and 708c, 708d of the loop pole piece 702 cooperate to define the inner region 710 of the magnetic circuit. The shaped magnets 704a, 704b are disposed within the inner region 710 and are positioned adjacent the opposite wall portions 708a, 708b, respectively, with the north pole N of the magnet 704a positioned adjacent the wall portion 708a and with the south pole S of the magnet 704b positioned adjacent the wall portion 708b. However, it should be understood that the orientation of one or both of the shaped magnets 704a, 704b relative to the wall portions 708a, 708b may be reversed. In the illustrated embodiment of the invention, the wall portions 708a, 708b of the pole piece 702 each define a concave inner surface 712 configured for adjoinment with a corresponding convex outer surface 714 of the shaped magnets 704a, 704b. However, it should be understood that other configurations of the shaped magnets 704a, 704b and/or the wall portions 708a, 708b are also contemplated as falling within the scope of the present invention, including the rectangular or linear configuration illustrated and described above with regard to the position sensors 600 and 600'. Additionally, although the magnetic circuit is illustrated and described as including a pair of shaped magnets 704a, 704b, it should be understood that the magnetic circuit may include any number of magnets, including a single magnet or three or more magnets.

In one embodiment of the invention, each of the position sensors 700, 700' includes a pair of magnetic flux sensors 14a, 14b that are positioned within the air gap G to sense varying magnitudes of magnetic flux density passing through sensing planes S as the magnetic field M is rotated about the axis of rotation $R_2$. The magnetic flux sensors 14a, 14b in turn generate an electronic signal, such as a voltage signal, that is proportional to the magnitude of the sensed magnetic flux density. Preferably, the magnetic field strength or flux density sensed by the magnetic flux sensors 14a, 14b is proportional to the rotational position/orientation of the sensors 14a, 14b relative to the magnetic circuit and the magnetic field M. Additionally, the voltage signal generated by the magnetic flux sensors 14a, 14b is preferably substantially linear over a predetermined range of rotational travel and exhibits minimal magnetic hysteresis.

Although the position sensors 700 and 700' are illustrated and described herein as including a pair of magnetic flux sensors 14a, 14b, it should be understood that one or three or more magnetic flux sensors may be used to sense varying magnitudes of magnetic flux density within the air gap G. In a preferred embodiment of the invention, the magnetic flux sensors 14a, 14b are Hall devices that function to sense varying magnitudes of magnetic flux density in directions substantially perpendicular to the sensing plane S. However, other types and configurations of magnetic flux sensors are also contemplated as would occur to one of skill in the art including, for example, MR-type sensors.

In the illustrated embodiment of the invention, the magnetic flux sensors 14a, 14b are arranged along sensor axes 17a, 17b, respectively, which extend generally along respective ones of the sensing planes S. Additionally, the sensor axes 17a, 17b are each offset from and arranged substantially parallel to the axis of rotation $R_2$ of the magnetic circuit. In a preferred embodiment of the invention, the sensor axes 17a, 17b are arranged on diametrically opposite sides of the axis of rotation $R_2$ and are offset from the axis of rotation $R_2$ by an equal distance. As a result, the sensor axes 17a, 17b of the magnetic flux sensors 14a, 14b travel along substantially identical sensing paths 18a, 18b which extend along a common radius as the magnetic circuit is rotated about the axis of rotation $R_2$. Additionally, the sensing range of each of the magnetic rotational position sensors 700 and 700' preferably extends over a one-hundred and eighty (180) degree range of rotation. Accordingly, the sensing paths 18a, 18b may also extend along a one-hundred and eighty (180) degree radial arc. In one embodiment, the axis of rotation $R_2$ of the magnetic circuit is arranged co-axial with the axis of rotation $R_1$ of the control shaft. However, in other embodiments of the invention, the axis of rotation $R_2$ of the magnetic circuit may be offset from the axis of rotation $R_1$ of the control shaft.

With regard to the magnetic rotational position sensor 700, the flux sensors 14a, 14b are positioned such that the sensing planes S are arranged in a co-planar relationship, with the sensing planes S preferably intersecting the axis of rotation $R_2$. With regard to the magnetic rotational position sensor 700', the flux sensors 14a, 14b are positioned such that the sensing planes S are arranged in a parallel and offset relationship, with the sensing planes S arranged on opposite sides of the axis of rotation $R_2$. Although the magnetic rotational position sensor 700' illustrates the flux sensors 14a, 14b as being offset from one another by a distance d, it should be understood that the flux sensors 14a, 14b may be positioned such that their inwardly facing surfaces are arranged proximately adjacent one another or in an abutting relationship (i.e., wherein the distance d is zero).

Due to the unique configuration and positioning of the shaped magnets 704a, 704b, the density or concentration of the magnetic field within the air gap G is relatively uniform, with the magnetic field lines extending generally parallel with the longitudinal axis L and providing a generally symmetrical magnetic field M relative to both the longitudinal axis L and the transverse axis T. As should be appreciated, as the magnetic circuit is rotated about the axis of rotation $R_2$, the angular orientation of the magnetic flux sensors 14a, 14b relative to the magnetic field M will correspondingly change so as to sense varying magnitudes of magnetic flux density passing through the sensing planes S (i.e., the normal magnetic flux passing perpendicularly through the sensing planes S). Additionally, since the magnetic field lines extending along the longitudinal axis L are relatively uniform and are arranged substantially parallel with the longitudinal axis L, the sensitivity associated with the positioning and alignment of the magnetic flux sensors 14a, 14b within the air gap G is reduced, thereby resulting in increased linearity and decreased hysteresis of sensor signal output.

As should also be appreciated, since the magnetic field M is generally uniform and symmetrical relative the longitudinal axis L, the sensed magnitude of magnetic flux will vary in a substantially linear manner as the magnetic field M is rotated about the axis of rotation $R_2$, with the sensed magnitude of magnetic flux density being approximately zero when the sensing planes S are positioned substantially parallel with the longitudinal axis L. As should further be appreciated, since the magnetic field M is uniform and symmetrical relative the transverse axis T, the magnitude of magnetic flux sensed by the magnetic flux sensor 14a will be substantially equal to that sensed by magnetic flux sensor 14b arranged diametrically opposite the magnetic flux sensor 14a. As a result, the magnetic flux sensors 14a, 14b may be used to generate substantially equal or redundant output signals that correspond to the particular rotational position of the sensors 14a, 14b along the radial sensing paths 18a, 18b relative to the magnetic field M, which in turn corresponds to the particular rotational position of the control shaft 20.

In one embodiment of the invention, the magnetic flux sensors 14a, 14b remain in a stationary position while the magnetic field M generated by the magnetic circuit is rotated about the axis of rotation $R_2$. However, in another embodiment of the invention, the magnetic field M remains in a stationary position while the magnetic flux sensors 14a, 14b are rotated about the axis of rotation $R_2$. In still another embodiment of the invention, the magnetic flux sensors 14a, 14b and the magnetic field M may both be rotated about the axis of rotation $R_2$, either at different rates and/or in opposite directions relative to one another.

While the present invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A magnetic rotational position sensor, comprising:
   first and second magnets spaced apart to define an air gap and cooperating with one another to generate a magnetic field extending across said air gap and positioned along an axis of rotation;
   a first magnetic flux sensor defining a first sensing plane extending along a first sensor axis, said first sensor axis arranged substantially parallel with and offset from said axis of rotation, said first magnetic flux sensor positioned within said magnetic field and operable to sense varying magnitudes of magnetic flux in response to relative rotational movement between said magnetic field and said first magnetic flux sensor about said axis of rotation and to generate a first output signal representative of a rotational position of said first magnetic flux sensor relative to said magnetic field; and a second magnetic flux sensor defining a second sensing plane extending along a second sensor axis, said second sensor axis arranged substantially parallel with and offset from said axis of rotation, said second magnetic flux sensor positioned within said magnetic field and operable to sense varying magnitudes of magnetic flux in response to relative rotational movement between said magnetic field and said second magnetic flux sensor about said axis of rotation and to generate a second output signal representative of a rotational position of said second magnetic flux sensor relative to said magnetic field.

2. The magnetic rotational position sensor of claim 1, wherein said first sensor axis is offset from said axis of rotation in a direction substantially parallel with said first sensing plane, said second sensor axis being offset from said axis of rotation in a direction substantially parallel with said second sensing plane, said first and second magnetic flux sensors being positioned on opposite sides of said axis of rotation.

3. The magnetic rotational position sensor of claim 1, wherein said first sensing plane and said second sensing plane are substantially co-planar to one another, said first and second magnetic flux sensors being positioned on opposite sides of said axis of rotation.

4. The magnetic rotational position sensor of claim 1, wherein said first sensor axis is offset from said axis of rotation in a direction substantially perpendicular to said first sensing plane, said second sensor axis being offset from said axis of rotation in a direction substantially perpendicular to said second sensing plane, said first and second magnetic flux sensors being positioned on opposite sides of said axis of rotation.

5. The magnetic rotational position sensor of claim 1, wherein said first sensing plane and said second sensing plane are substantially parallel with one another and offset from one another.

6. The magnetic rotational position sensor of claim 5, wherein said first and second magnetic flux sensors are positioned on opposite sides of said axis of rotation.

7. The magnetic rotational position sensor of claim 1, wherein said first and second magnets are arranged along a central longitudinal axis, said air gap extending along a central transverse axis oriented substantially perpendicular to said central longitudinal axis, said magnetic field being substantially symmetrical relative to both said central longitudinal axis and said central transverse axis.

8. The magnetic rotational position sensor of claim 1, wherein said first output signal is substantially equal to said second output signal.

9. The magnetic rotational position sensor of claim 1, wherein said first magnet has a first pole surface facing said air gap, said second magnet having a second pole surface facing said air gap and arranged generally opposite said first pole surface, each of said first and second pole surfaces having an arcuate configuration.

10. The magnetic rotational position sensor of claim 9, wherein each of said first and second pole surfaces defines a concave curvature facing said air gap.

11. The magnetic rotational position sensor of claim 9, wherein each of said first and second magnets has an arc-shaped configuration defining a segment of an annular ring.

12. The magnetic rotational position sensor of claim 9, wherein said first magnet has a first planar pole surface opposite said first pole surface facing said air gap, said second magnet having a second planar pole surface opposite said second pole surface facing said air gap, each of said first and second planar pole surfaces positioned proximately adjacent a linear wall portion of an outer loop pole piece.

13. The magnetic rotational position sensor of claim 1, further comprising: a first shaped pole piece positioned adjacent a first pole surface of said first magnet; and a a second shaped pole piece positioned adjacent a second pole surface of said second magnet, said first and second pole surfaces being of opposite polarity; and wherein each of said first and second shaped pole pieces defines an inner arcuate surface facing said air gap, said inner arcuate surface having a generally concave configuration; and wherein said inner arcuate surfaces of said first and second shaped pole pieces face one another across said air gap, said magnets and said shaped pole pieces cooperating to provide said magnetic field extending across said air gap.

14. The magnetic rotational position sensor of claim 1, further comprising a loop pole piece defining an inner region, said first and second magnets positioned within said inner region and cooperating with said loop pole piece to generate said magnetic field extending across said air gap; and wherein said loop pole piece has a substantially rectangular configuration including first and second wall portions arranged substantially parallel to one another and spaced apart to at least partially define said inner region of said loop pole piece, said first magnet having a substantially planar first pole surface positioned adjacent said first wall portion, said second magnet having a substantially planar second pole surface positioned adjacent said second wall portion.

15. The magnetic rotational position sensor of claim 1, wherein said first and second magnets each have a substantially rectangular configuration.

16. The magnetic rotational position sensor of claim 15, further comprising: a first shaped pole piece positioned adjacent said first magnet; and a second shaped pole piece positioned adjacent said second magnet; and wherein said first and second shaped pole pieces face one another across said air gap and cooperate with said first and second magnets to provide said magnetic field extending across said air gap.

17. The magnetic rotational position sensor of claim 16, wherein said first and second shaped pole pieces each define an inner surface defining a concave curvature and facing said air gap.

18. The magnetic rotational position sensor of claim 1, further comprising a loop pole piece defining an inner region, said first and second magnets positioned within said inner region and cooperating with said loop pole piece to generate said magnetic field extending across said air gap; and wherein said loop pole piece has a first overall dimension along a first axis and a second overall dimension along a second axis arranged substantially perpendicular to said first axis, said first overall dimension being greater than said second overall dimension to provide said loop pole piece with an oblong configuration.

19. The magnetic rotational position sensor of claim 18, wherein said oblong configuration of said loop pole piece comprises one of a substantially oval configuration and a substantially ellipsoidal configuration.

20. The magnetic rotational position sensor of claim 1, further comprising:

a first shaped pole piece, said first magnet is secured in a stationary position relative to said first shaped pole piece; and a second shaped pole piece, said second magnet is secured in a stationary position relative to said second shaped pole piece, said first and second shaped pole pieces facing one another across said air gap and cooperating with said first and second magnets to generate said magnetic field extending across said air gap.

21. The magnetic rotational position sensor of claim 20, wherein each of said first and second shaped pole pieces has an inner surface facing said air gap, said inner surface having an arcuate configuration.

22. The magnetic rotational position sensor of claim 21, wherein each of said inner surfaces of said first and second shaped pole pieces defines a concave curvature facing said air gap.

23. The magnetic rotational position sensor of claim 20, wherein said first shaped pole piece is attached to a first pole surface of said first magnet; and wherein said second shaped pole piece is attached to a second pole surface of said second magnet.

24. The magnetic rotational position sensor of claim 23, wherein each of said first and second shaped pole pieces includes:

a central portion positioned adjacent a respective one of said first and second pole surfaces of said first and second magnets; and opposite side portions extending laterally beyond said respective one of said first and second pole surfaces.

25. The magnetic rotational position sensor of claim 24, wherein each of said opposite side portions of said first and second shaped pole pieces defines a concave surface facing said air gap.

26. The magnetic rotational position sensor of claim 24, wherein each of said opposite side portions of said first and second shaped pole pieces has a reduced thickness relative to said central portion.

27. The magnetic rotational position sensor of claim 20, further comprising:

a loop pole piece including first and second wall portions each having a substantially linear configuration and arranged generally parallel to one another, said first and second magnets each having a generally rectangular configuration and including a substantially planar pole surface positioned adjacent respective ones of said first and second wall portions.

28. The magnetic rotational position sensor of claim 1, further comprising a loop pole piece having a peripheral outer wall defining an inner region, said loop pole piece having a first overall dimension along a first axis and a second overall dimension along a second axis arranged substantially perpendicular to said first axis, said first overall dimension being greater than said second overall dimension to provide said ioop pole piece with an oblong configuration;

said first and second magnets positioned within said inner region of said loop pole piece adjacent said peripheral outer wall and spaced apart to define said air gap; and wherein said peripheral outer wall includes a pair of opposing arcuate inner surfaces, each of said first and second magnets having an arcuate outer pole surface positioned adjacent a respective one of said arcuate inner surfaces of said peripheral outer wall.

29. The magnetic rotational position sensor of claim 28, wherein said first magnet is positioned adjacent a first portion of said peripheral outer wall extending generally along said first axis, said second magnet positioned adjacent a second portion of said peripheral outer wall extending generally along said first axis.

30. The magnetic rotational position sensor of claim 28, wherein said oblong configuration of said loop pole piece comprises one of a substantially oval configuration and a substantially ellipsoidal configuration.

* * * * *